US012712622B2

(12) United States Patent
Zhou et al.

(10) Patent No.: US 12,712,622 B2
(45) Date of Patent: Aug. 18, 2026

(54) ENHANCED BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 819 days.

(21) Appl. No.: 17/672,511

(22) Filed: Feb. 15, 2022

(65) Prior Publication Data

US 2023/0261728 A1 Aug. 17, 2023

(51) Int. Cl.

| | |
|---|---|
| ***H04B 7/08*** | (2006.01) |
| ***H04L 5/00*** | (2006.01) |
| ***H04W 24/08*** | (2009.01) |
| ***H04W 24/10*** | (2009.01) |
| ***H04W 76/19*** | (2018.01) |

(52) U.S. Cl.

CPC ........... *H04B 7/088* (2013.01); *H04L 5/0048* (2013.01); *H04W 24/08* (2013.01); *H04W 24/10* (2013.01); *H04W 76/19* (2018.02)

(58) Field of Classification Search

CPC ..... H04B 7/088; H04B 7/0695; H04L 5/0048; H04L 5/006; H04L 5/0025; H04L 5/0094; H04W 24/08; H04W 24/10; H04W 76/19; H04W 76/28

See application file for complete search history.

(56) References Cited

U.S. PATENT DOCUMENTS

| | | | | |
|---|---|---|---|---|
| 2018/0288757 | A1* | 10/2018 | Sun | H04B 7/0696 |
| 2019/0238658 | A1* | 8/2019 | Shimizu | H04W 4/46 |
| 2019/0261193 | A1* | 8/2019 | Torsner | H04W 24/10 |
| 2020/0374960 | A1* | 11/2020 | Deenoo | H04B 7/088 |
| 2020/0413273 | A1* | 12/2020 | Turtinen | H04W 76/28 |
| 2021/0184748 | A1* | 6/2021 | Luo | H04W 52/143 |
| 2021/0218457 | A1* | 7/2021 | Xu | H04B 7/088 |
| 2021/0258063 | A1* | 8/2021 | Ottersten | H04W 24/10 |
| 2022/0029286 | A1* | 1/2022 | Cho | H01Q 21/06 |
| 2022/0109547 | A1* | 4/2022 | Svedman | H04B 7/0626 |
| 2022/0247474 | A1* | 8/2022 | Rune | H04W 24/10 |
| 2022/0345859 | A1* | 10/2022 | Falla Cepeda | H04W 4/40 |
| 2023/0006727 | A1* | 1/2023 | Jang | H04L 5/0051 |
| 2023/0123472 | A1* | 4/2023 | Alkhateeb | G06N 3/08 375/262 |
| 2023/0144860 | A1* | 5/2023 | Kassir | H04W 76/18 375/262 |
| 2024/0089787 | A1* | 3/2024 | Khosravirad | H04W 28/18 |

* cited by examiner

*Primary Examiner* — Hoang-Chuong Q Vu

(74) *Attorney, Agent, or Firm* — Holland & Hart LLP

(57) ABSTRACT

Methods, systems, and devices for wireless communications are described. A wireless communications system may support techniques for enhanced beam failure detection. In some cases, a user equipment (UE) may receive a configuration associated with a beam blocking prediction procedure for the UE. The may monitor one or more reference signals based on the configuration and a beam failure detection (BFD) procedure associated with the beam blocking prediction procedure. Further, the UE may perform the beam blocking prediction procedure in accordance with the configuration and may modify the BFD procedure based a blocking prediction determined based on the beam blocking prediction procedure. The UE may perform the modified BFD procedure based on the blocking prediction.

30 Claims, 16 Drawing Sheets

ENHANCED BEAM FAILURE DETECTION

FIELD OF TECHNOLOGY

The following relates to wireless communications, including enhanced beam failure detection (BFD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support enhanced beam failure detection (BFD). Generally, the described techniques provide for performing a beam blocking prediction procedure and modifying a BFD procedure based on a blocking prediction determined during the beam blocking prediction procedure. For example, a user equipment (UE) may perform a BFD procedure by monitoring reference signals and measuring the signal quality of the reference signals to detect beam failure instances (BFIs). That is, the UE may compare the signal quality of a reference signal to a threshold quality and detect a BFI (e.g., generate a BFI indicator) based on the signal quality failing to exceed the threshold. In some cases, the UE may perform a beam blocking prediction procedure including detecting a quantity of BFIs (e.g., consecutive BFI indicators) and determining a blocking prediction based on the quantity of consecutive BFIs exceeding a threshold quantity. In some other cases, the UE may perform a beam blocking prediction procedure, which may include inputting a set of parameters, based on the monitoring for the reference signals, into a machine learning (ML) model and determining a blocking prediction based on the ML model. That is, the ML model may output a blocking prediction based on the inputted set of parameters. In some cases, the set of parameters may include a signal-to-interference-plus-noise ratio (SINR), a reference signal received power (RSRP), a signal-to-noise ratio (SNR), a pathloss measurement, a quantity of BFI indicators detected by the UE, a quantity of available preambles for performing a contention free random access (CFRA) procedure, or a combination thereof.

Additionally, or alternatively, the UE may modify the BFD procedure based on a blocking prediction determined based on a beam blocking prediction procedure. In some cases, the UE may modify the BFD procedure by pausing or refraining from counting of BFIs during a duration associated with the blocking prediction. For example, the UE may refrain from counting BFI indicators during the duration associated with the blocking prediction. In some other cases, the UE may modify the BFD procedure by pausing the monitoring for reference signals during a duration associated with the blocking prediction. For example, a network entity may continue to transmit reference signals during the duration associated with the blocking prediction, however, the UE may refrain from measuring the reference signals during the duration associated with the blocking prediction. In either case, the UE may resume counting of BFIs or monitoring for reference signals after the duration associated with the blocking prediction has passed. Performing a beam blocking prediction procedure and modifying a BFD procedure based on a blocking prediction determined based on a beam blocking prediction procedure may result in reduced power consumption and reduced latency.

A method for wireless communications at a UE is described. The method may include receiving a message indicating a configuration associated with a beam blocking prediction procedure for the UE, monitoring for one or more reference signals based on the configuration and a beam failure detection procedure associated with the beam blocking prediction procedure, performing the beam blocking prediction procedure in accordance with the configuration based on the monitoring for the one or more reference signals, modifying the beam failure detection procedure based on a blocking prediction determined based on the beam blocking prediction procedure, and performing the modified beam failure detection procedure based on the blocking prediction.

An apparatus for wireless communications at a UE is described. The apparatus may include a processor, memory coupled with the processor, and instructions stored in the memory. The instructions may be executable by the processor to cause the apparatus to receive a message indicating a configuration associated with a beam blocking prediction procedure for the UE, monitor for one or more reference signals based on the configuration and a beam failure detection procedure associated with the beam blocking prediction procedure, perform the beam blocking prediction procedure in accordance with the configuration based on the monitoring for the one or more reference signals, modify the beam failure detection procedure based on a blocking prediction determined based on the beam blocking prediction procedure, and perform the modified beam failure detection procedure based on the blocking prediction.

Another apparatus for wireless communications at a UE is described. The apparatus may include means for receiving a message indicating a configuration associated with a beam blocking prediction procedure for the UE, means for monitoring for one or more reference signals based on the configuration and a beam failure detection procedure associated with the beam blocking prediction procedure, means for performing the beam blocking prediction procedure in accordance with the configuration based on the monitoring for the one or more reference signals, means for modifying the beam failure detection procedure based on a blocking prediction determined based on the beam blocking prediction procedure, and means for performing the modified beam failure detection procedure based on the blocking prediction.

A non-transitory computer-readable medium storing code for wireless communications at a UE is described. The code may include instructions executable by a processor to receive a message indicating a configuration associated with a beam blocking prediction procedure for the UE, monitor for one or more reference signals based on the configuration and a beam failure detection procedure associated with the beam blocking prediction procedure, perform the beam blocking prediction procedure in accordance with the configuration based on the monitoring for the one or more reference signals, modify the beam failure detection procedure based on a blocking prediction determined based on the beam blocking prediction procedure, and perform the modified beam failure detection procedure based on the blocking prediction.

In some examples of the method, apparatuses, and non-transitory computer-readable medium described herein, performing the beam blocking prediction procedure may include operations, features, means, or instructions for determining the blocking prediction based on one or more beam failure instance indicators detected by the UE.

Some examples of the method, apparatuses, and non-transitory computer-readable medium described herein may further include operations, features, means, or instructions for detecting a quantity of consecutive beam failure instance indicators based on one or more measurements associated with the monitoring for the one or more reference signals, where determining the blocking prediction may be based on the quantity of consecutive beam failure instance indicators exceeding a threshold quantity.

In some examples of the method, apparatuses, and non-transitory computer-readable medium described herein, performing the beam blocking prediction procedure may include operations, features, means, or instructions for determining the blocking prediction based on a machine learning model.

In some examples of the method, apparatuses, and non-transitory computer-readable medium described herein, determining the blocking prediction based on the machine learning model may include operations, features, means, or instructions for inputting a set of parameters associated with the beam failure detection procedure into the machine learning model, where the set of parameters associated with the beam failure detection procedure may be based on the monitoring.

In some examples of the method, apparatuses, and non-transitory computer-readable medium described herein, the set of parameters associated with the beam failure detection procedure includes a SINR, a RSRP, a SNR, a pathloss measurement, a quantity of BFI indicators detected by the UE, a quantity of available preambles for performing a CFRA procedure, or a combination thereof.

In some examples of the method, apparatuses, and non-transitory computer-readable medium described herein, performing the beam blocking prediction procedure may include operations, features, means, or instructions for performing the beam blocking prediction procedure based on a set of prediction parameters associated with the beam blocking prediction procedure, where the configuration associated with the beam blocking procedure indicates the set of prediction parameters.

In some examples of the method, apparatuses, and non-transitory computer-readable medium described herein, the set of prediction parameters includes a threshold quantity of consecutive beam failure instance indicators, a machine learning model, one or more parameters associated with the machine learning model, a prediction method indicator, or any combination thereof.

In some examples of the method, apparatuses, and non-transitory computer-readable medium described herein, modifying the beam failure detection procedure may include operations, features, means, or instructions for modifying the beam failure detection procedure based on an indication of a configuration switch, where the configuration associated with the beam blocking procedure includes the indication of the configuration switch.

In some examples of the method, apparatuses, and non-transitory computer-readable medium described herein, performing the modified beam failure detection procedure may include operations, features, means, or instructions for pausing the monitoring for the one or more reference signals during a blocking period associated with the blocking prediction and resuming the monitoring for the one or more reference signals after the blocking period.

In some examples of the method, apparatuses, and non-transitory computer-readable medium described herein, performing the modified beam failure detection procedure may include operations, features, means, or instructions for pausing counting of beam failure instance indicators detected by the UE during a blocking period associated with the blocking prediction and resuming the counting of beam failure instance indicators detected by the UE after the blocking period.

Some examples of the method, apparatuses, and non-transitory computer-readable medium described herein may further include operations, features, means, or instructions for receiving an activation message instructing the UE to activate the beam blocking prediction procedure, the modified beam failure detection procedure, or both, where the beam block prediction procedure, the modified beam failure detection procedure, or both, may be performed based on the activation message.

Some examples of the method, apparatuses, and non-transitory computer-readable medium described herein may further include operations, features, means, or instructions for transmitting a request message requesting activation of the beam blocking prediction procedure, the modified beam failure detection procedure, or both, where the activation message may be received in response to the request message.

In some examples of the method, apparatuses, and non-transitory computer-readable medium described herein, activation of the beam blocking prediction procedure, the modified beam failure detection procedure, or both, may be based on a quality of service parameter, a power restraint parameter of the UE, a capacity associated with the UE, one or more parameters associated with a discontinuous cycle of the UE, or any combination thereof.

Some examples of the method, apparatuses, and non-transitory computer-readable medium described herein may further include operations, features, means, or instructions for receiving a deactivation message instructing the UE to deactivate the beam blocking prediction procedure, the modified beam failure detection procedure, or both and deactivating the beam blocking prediction procedure, the modified beam failure detection procedure, or both, based on the deactivation message.

Some examples of the method, apparatuses, and non-transitory computer-readable medium described herein may further include operations, features, means, or instructions for transmitting a request message requesting deactivation of the beam blocking prediction procedure, the modified beam failure detection procedure, or both, where the deactivation message may be received in response to the request message.

In some examples of the method, apparatuses, and non-transitory computer-readable medium described herein, deactivation of the beam blocking prediction procedure, the modified beam failure detection procedure, or both, may be based on a quality of service parameter, a power restraint parameter of the UE, a capacity associated with the UE, one or more parameters associated with a discontinuous cycle of the UE, or any combination thereof.

Some examples of the method, apparatuses, and non-transitory computer-readable medium described herein may further include operations, features, means, or instructions for measuring a signal quality of a first reference signal of the one or more reference signals and detecting a beam failure instance for the first reference signal based on the signal quality being below a threshold quality.

Some examples of the method, apparatuses, and non-transitory computer-readable medium described herein may further include operations, features, means, or instructions for initiating a timer associated with the beam failure detection procedure based on the beam failure instance and counting a quantity of beam failure instances during a duration associated with the timer.

In some examples of the method, apparatuses, and non-transitory computer-readable medium described herein, the one or more reference signals includes one or more beam failure detection reference signals, channel state information reference signals, or synchronization signal blocks.

A method for wireless communications at a network entity is described. The method may include transmitting a message indicating a configuration associated with a beam blocking prediction procedure for a UE and transmitting one or more reference signals based on the configuration and a beam failure detection procedure associated with the beam blocking prediction procedure.

An apparatus for wireless communications at a network entity is described. The apparatus may include a processor, memory coupled with the processor, and instructions stored in the memory. The instructions may be executable by the processor to cause the apparatus to transmit a message indicating a configuration associated with a beam blocking prediction procedure for a UE and transmit one or more reference signals based on the configuration and a beam failure detection procedure associated with the beam blocking prediction procedure.

Another apparatus for wireless communications at a network entity is described. The apparatus may include means for transmitting a message indicating a configuration associated with a beam blocking prediction procedure for a UE and means for transmitting one or more reference signals based on the configuration and a beam failure detection procedure associated with the beam blocking prediction procedure.

A non-transitory computer-readable medium storing code for wireless communications at a network entity is described. The code may include instructions executable by a processor to transmit a message indicating a configuration associated with a beam blocking prediction procedure for a UE and transmit one or more reference signals based on the configuration and a beam failure detection procedure associated with the beam blocking prediction procedure.

In some examples of the method, apparatuses, and non-transitory computer-readable medium described herein, transmitting the message indicating the configuration may include operations, features, means, or instructions for transmitting a set of prediction parameters associated with the beam blocking prediction procedure, where the set of prediction parameters includes a threshold quantity of consecutive beam failure instance indicators, a machine learning model, one or more parameters associated with the machine learning model, a prediction type parameter, a modification parameter, a configuration switch indicator, or any combination thereof.

Some examples of the method, apparatuses, and non-transitory computer-readable medium described herein may further include operations, features, means, or instructions for transmitting an activation message to activate the beam blocking prediction procedure, a modified beam failure detection procedure, or both.

Some examples of the method, apparatuses, and non-transitory computer-readable medium described herein may further include operations, features, means, or instructions for receiving a request message requesting activation of the beam blocking prediction procedure, the modified beam failure detection procedure, or both where the activation message may be transmitted in response to the request message.

Some examples of the method, apparatuses, and non-transitory computer-readable medium described herein may further include operations, features, means, or instructions for transmitting a deactivation message to deactivate the beam blocking prediction procedure, a modified beam failure detection procedure, or both.

Some examples of the method, apparatuses, and non-transitory computer-readable medium described herein may further include operations, features, means, or instructions for receiving a request message requesting deactivation of the beam blocking prediction procedure, the modified beam failure detection procedure, or both, where the deactivation message may be transmitted in response to the request message.

DETAILED DESCRIPTION

Figure 1:
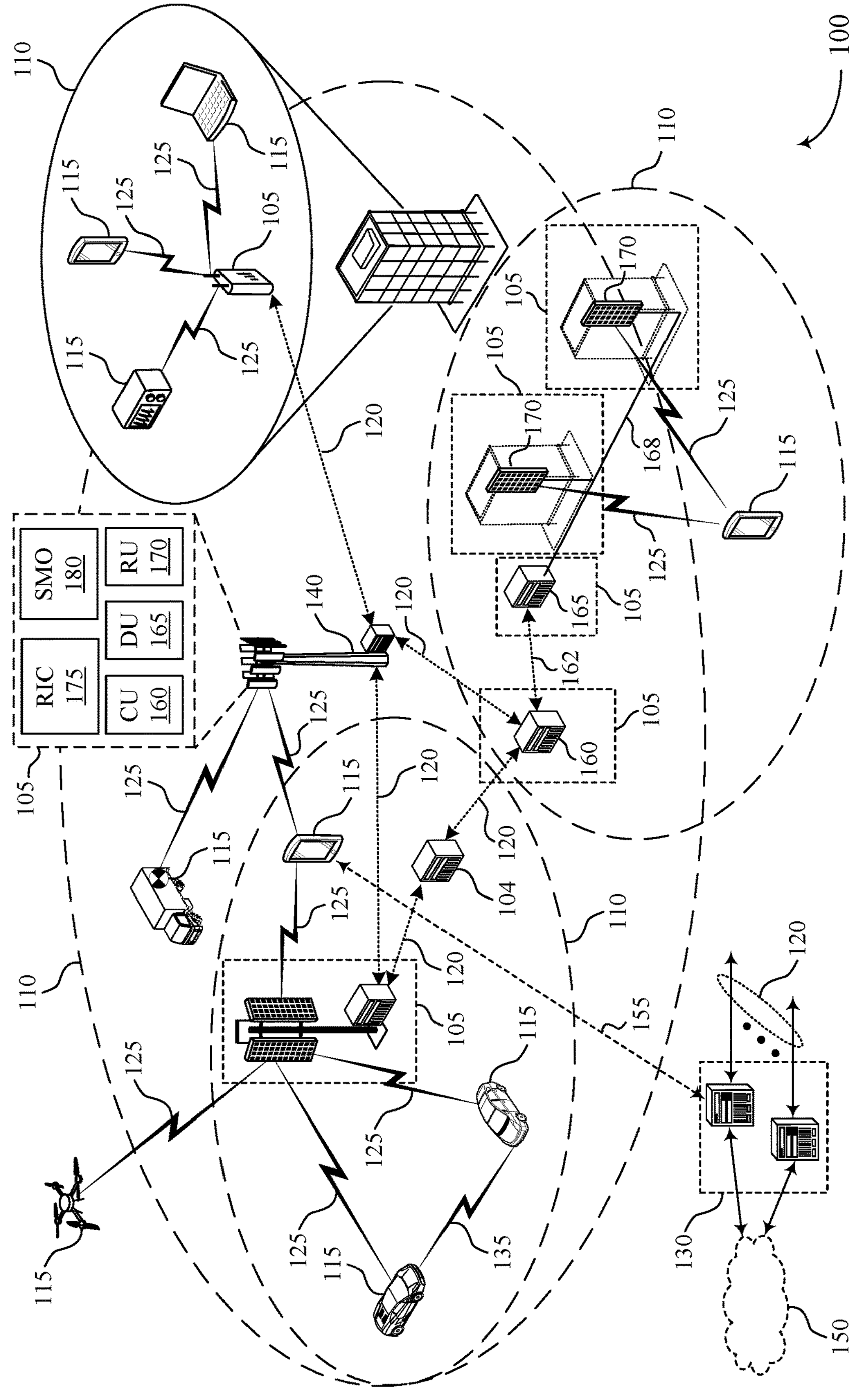
FIG. 1 illustrates an example of a wireless communications system that supports enhanced beam failure detection (BFD) in accordance with one or more aspects of the present disclosure.

Some wireless communications systems may support beamformed communications between communication devices using one or more beams, such as between a user equipment (UE) and a network entity (such as one or more components of a base station, which may be co-located, geographically distributed, or virtually distributed). In some implementations, a UE may perform a beam failure procedure to support beamformed communications. For example, the UE may perform a beam failure detection (BFD) procedure to determine whether a beam used to communicate with the network entity has failed (e.g., a signal strength is below a threshold). Additionally, or alternatively, the UE may perform a beam failure recovery (BFR) procedure (e.g., in response to determining that beam failure has occurred) to re-establish a connection with the network entity and select one or more different beams to use to communicate with the network entity. In some implementations, the UE may experience temporary blocking, or blocking that may be resolved without performing a BFR procedure. However, because the temporary blocking may result in interference of the beam used to communicate with the network entity, the UE may determine that the beam has failed based on a BFD procedure. As such, the UE may initiate a BFR procedure based on the determining, resulting in increased power consumption and decreased communication latency.

Techniques, systems, and devices are described herein for enabling enhanced BFD. For example, a UE may be configured to perform a beam blocking prediction procedure. That is, the UE may monitor one or more reference signals (e.g., BFD reference signals (BFD-RSs)) during a BFD procedure and measure the signal quality of the reference signals to detect beam failure instances (BFIs). For example, the signal quality of a reference signal may be below a threshold quality and the UE may generate a BFI indicator associated with a detection of a BFI based on the signal quality being below the threshold quality. The UE may count a quantity of BFIs (e.g., BFI indicators) during a duration associated with the BFD procedure. In some examples, the UE may count a quantity of consecutive BFIs that exceeds a threshold quantity, and the UE may determine a blocking prediction based on the exceedance. That is, the UE may determine that temporary blocking is occurring based on the quantity of consecutive BFIs exceeding the threshold quantity. In some other examples, the UE may determine a set of parameters associated with the BFD procedure based on the monitoring for the reference signals. The UE may input the set of parameters into a machine learning (ML) model and the ML model may output a blocking prediction. That is, the UE may determine that temporary blocking is occurring or is going to occur bases on ML model output.

Additionally, or alternatively, the UE may modify the BFD procedure based on a blocking prediction determined via the beam blocking prediction procedure. For example, the UE may pause or refrain from counting BFIs during a predicted blocking period associated with the blocking prediction and may resume counting after the predicted blocking period. In some other examples, the UE may pause monitoring for the reference signals during the predicted blocking period and may resume monitoring after the predicted blocking period. Performing a beam blocking prediction procedure and modifying a BFD procedure based on a blocking prediction determined based on a beam blocking prediction procedure may prevent the UE from determining that a beam has failed based on temporary blocking and initiating a BFR procedure associated with increased power consumption and increased latency.

Aspects of the disclosure are initially described in the context of wireless communications systems. Aspects of the disclosure are then described in the context of communication sequences, a ML process, and a process flow. Aspects of the disclosure are further illustrated by and described with reference to apparatus diagrams, system diagrams, and flowcharts that relate to enhanced BFD.

FIG. 1 illustrates an example of a wireless communications system 100 that supports enhanced BFD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (RIC) 175 (e.g., a Near-Real Time RIC (Near-RT RIC), a Non-Real Time RIC (Non-RT RIC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 175 is flexible and may support different functionalities depending upon which functions (e.g., network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support enhanced BFD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity

105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

To support beamformed communications, a UE 115 and one or more components of a network entity 105 may perform beam failure procedure, such as BFD procedures or BFR procedures. For example, various factors, such as interference or noise, may cause a beam used by the UE 115 or the one or more components of the network entity 105 to fail such that signals communicated using the beam may suffer reduced quality and, in some implementations, may not be properly decoded. Accordingly, the UE 115 and the one or more components of the network entity 105 may discontinue communicating using the beam and may perform a BFR procedure during which one or more new beams may be selected (and indicated) for communicating.

In order to detect a failure of a beam, a UE 115 may perform a BFD procedure. For example, one or more components of a network entity 105 may transmit reference signals, such as BFD reference signals (BFD-RSs), that may enable the UE 115 to determine whether beam failure has occurred. In some implementations, BFD-RSs may be periodic reference signals (such as periodic CSI-RSs, periodic synchronization signal blocks (SSBs)) transmitted over configured time periods. To determine whether beam failure has occurred, the UE 115 may perform one or more channel measurements on the BFD-RSs and may compare or determine, at a physical layer at the UE 115, whether the one or more channel measurements satisfy a measurement threshold. If the one or more channel measurements satisfy the measurement threshold, the physical layer at the UE 115 may report a BFI to a MAC layer at the UE 115. In some implementations, the measurement threshold may be a threshold block error rate (BLER) (such as a 10% BLER), and a trigger condition for reporting the BFI may be that an estimated BLER of a BFD-RS satisfies the threshold BLER (such as having an estimated BLER based on a signal-to-interference-plus-noise ratio (SINR) measurement of the BFD-RS that meets or exceeds the threshold BLER). The MAC layer may maintain a count of the BFIs received from the physical layer, and, if the quantity of BFIs received from the physical layer satisfies (e.g., meets, crosses, falls below, or exceeds) a threshold quantity before an expiration of a BFD timer, the MAC layer may trigger the UE 115 to declare beam failure and transmit a beam failure report to the one or more components of the base station 105 (such as an indication that beam failure has occurred).

In response to the beam failure report, the UE 115 and the one or more components of the base station 105 may perform a BFR procedure to re-establish communications between the UE 115 and the one or more components of the network entity 105. For example, the UE 115 and the one or more components of the network entity 105 may perform the BFR procedure to select (and configure) one or more new beams for communicating messages between the UE 115 and the one or more components of network entity base station 105. To perform the BFR procedure, the UE 115 may initiate a BFR timer and may perform, while the BFR timer is running, one or more contention free random access (CFRA) procedures using one or more corresponding CFRA preambles to attempt to re-establish communications with the one or more components of the network entity 105. If the UE 115 fails to re-establish the communications with the one or more components of the network entity 105 via the one or more CFRA procedures, upon expiration of the BFR timer, the UE 115 may switch from performing CFRA procedures to performing contention-based random access (CBRA) procedures to re-establish communications with the one or more components of the network entity 105 until the communications are re-established. In some implementations, the UE may experience temporary blocking, or blocking that may be resolved without performing the BFR procedure. However, because the temporary blocking may result in interference of the beam used to communicate with the network entity, the UE may determine that the beam has failed based on a BFD procedure. As such, the UE may initiate the BFR procedure based on the determining, resulting in increased power consumption and decreased communication latency.

The wireless communications system 100 may support enhanced BFD techniques. For example, a UE 115 may for perform a beam blocking prediction procedure and modify a BFD procedure based on a blocking prediction determined during the beam blocking prediction procedure. In some cases, the UE 115 may perform the beam blocking prediction procedure by detecting a quantity of consecutive BFIs (e.g., BFI indicators) and determining a blocking prediction based on the quantity of consecutive BFIs exceeding a threshold quantity. In some other cases, the UE 115 may perform the beam blocking prediction procedure by determining a set of parameters associated with the BFD procedure, based on the monitoring for the reference signals, and inputting the set of parameters into a ML model. The UE may determine a blocking prediction based on an output of the ML model.

Additionally, or alternatively, the UE 115 may modify the BFD procedure based on a blocking prediction determined via a beam blocking prediction procedure. In some cases, the UE 115 may pause counting of BFIs (e.g., BFI indicators) for a duration associated with the blocking prediction (e.g., a predicted blocking period), as described with respect to FIG. 3B. In some other cases, the UE 115 may pause the monitoring for reference signals for a duration associated with the blocking prediction (e.g., a predicted blocking period), as described with respect to FIG. 4. In either case, the UE 115 may resume counting of BFIs or the monitoring for reference signals after the predicted blocking period.

Figure 2:
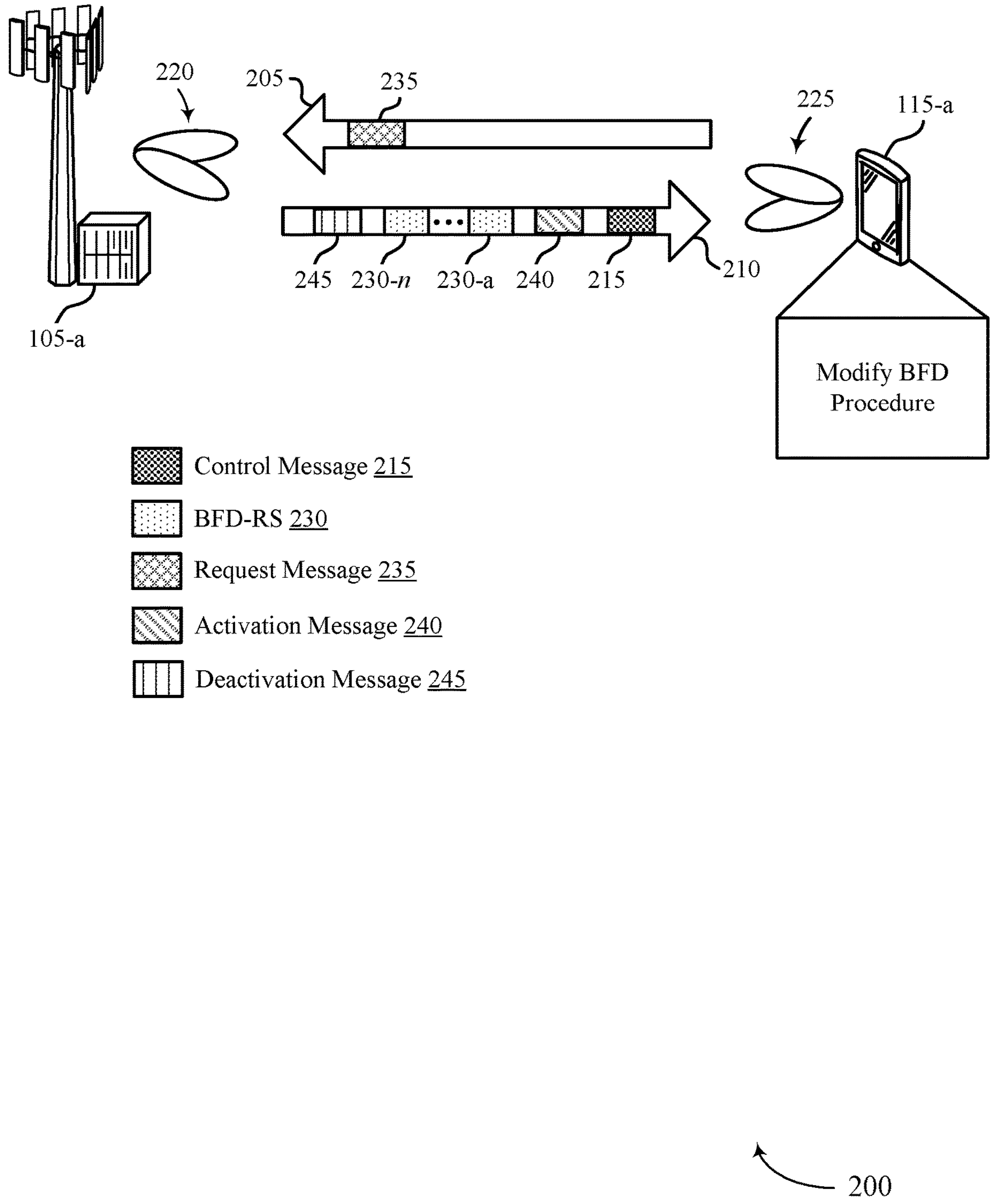
FIG. 2 illustrates an example of a wireless communications system that supports enhanced BFD in accordance with one or more aspects of the present disclosure.

FIG. 2 illustrates an example of a wireless communications system 200 that supports enhanced BFD in accordance with one or more aspects of the present disclosure. The wireless communications system 200 may implement or be implemented by aspects of the wireless communications system 100. For example, the wireless communications system 200 may include a network entity 105-*a* and a UE 115-*a*. The UE 115-*a* may represent an example of a UE 115 as described herein, including with reference to FIG. 1. The network entity 105-*a* may represent an example of a network entity 105 as described herein, including with reference to FIG. 1. The wireless communications system 200 may support beam blocking prediction procedures and modification of BFD procedures based on blocking predictions.

The wireless communications system 200 may support communications between the UE 115-*a* and the network entity 105-*a*. For example, the UE 115-*a* may transmit uplink messages to the network entity 105-*a* over a communication link 205 (which may be an example of a communication link 125 described with reference to FIG. 1) and may receive downlink messages on a communication link 210 (which may be an example of a communication link 125).

The wireless communications system 200 may additionally support beamformed communications between the network entity 105-*a* and the UE 115-*a*. For example, the network entity 105-*a* may transmit and receive messages using one or more of a set of network entity beams 220, and the UE 115-*a* may transmit and receive messages using one or more of a set of UE beams 225. To support the beamformed communications, the network entity 105-*a* and the UE 115-*a* may support performing a beam failure procedure, for example, to determine whether a network entity beam 220 or a UE beam 225 has failed, to re-establish communications between the UE 115-*a* and the network entity 105-*a* in the event that beam failure has occurred, or both. For example, in some implementations, the beam failure procedure may be an example of a BFD procedure during which the UE 115-*a* may determine whether beam failure has occurred (e.g., due to the uncertain nature of the wireless communications system 200 and unexpected blocking). In some implementations, the beam failure procedure may be an example of a BFR procedure during which the UE 115-*a* and the network entity 105-*a* may re-establish communications, for example, via performing one or more random access procedures and may select one or more new beams for communicating downlink messages and uplink messages.

To support the beam failure procedure, the network entity 105-*a* may transmit one or more BFD-RSs 230 to the UE 115-*a*, for example, according to a configuration associated with the beam failure procedure. For example, the network entity 105-*a* may transmit, as part of a BFD procedure, BFD-RSs 230 to the UE 115-*a* during periodically configured time periods, such as a BFD-RS 230-*a* through a BFD-RS 230-*n* each transmitted during a different periodic time period. In some implementations, the UE 115-*a* may measure the BFD-RSs 230 and may generate BFI indicators corresponding to one or more of the BFD-RSs 230 to determine whether beam failure has occurred as part of the BFD procedure. For example, the UE 115-*a* may initiate a BFD timer, for example, in response to receiving the BFD-RS 230-*a*, and may generate and report BFI indicators to a MAC layer while the BFD timer runs. If the UE 115-*a* generates and reports a threshold quantity of BFI indicators before an expiration of the BFD timer, the UE 115-*a* may determine that beam failure has occurred. Alternatively, upon expiration of the timer, the UE 115-*a* may determine that beam failure has not occurred if the UE 115-*a* does not generate and reports the threshold quantity of BFIs. In some implementations, if the UE 115-*a* determines that beam failure has occurred, the UE 115-*a* may initiate a BFR procedure with the network entity 105-*a* to re-establish a connection with the network entity 105-*a*. For example, the UE 115-*a* may initiate a BFR timer in response to determining that beam failure has occurred and may perform one or more CFRA procedures with the network entity 105-*a* while the BFR timer runs. If communications fail to be re-established via the one or more CFRA procedure, upon expiration of the BFR timer, the UE 115-*a* may perform one or more CBRA procedures with the network entity 105-*a* until communications are re-established.

In some implementations, the UE may experience temporary blocking, or blocking that may be resolved without performing the BFR procedure. For example, in some scenarios (e.g., higher frequency scenarios), the network entity beams 220 or the UE beams 225 may experience temporary blocking due to an object, such as a vehicle, passing through a network entity beam 220 or a UE beams 225, temporarily interfering with communications. In such cases, after a duration associated with the temporary blocking, the object may move out of the way of the network entity beam 220 or the UE beams 225 resulting in the network entity 105-*a* and the UE 115-*a* regaining connection. In some cases, the duration associated with the temporary may be shorter than a duration associated with performing a BFR procedure. As such, the network entity 105-*a* and the UE 115-*a* may regain connection faster if the network entity 105-*a* and the UE 115-*a* wait for the temporary blocking to resolve rather than performing a BFR procedure, which may increase latency and complexity. However, because the temporary blocking may result in interference of the beam used to communicate with the network entity 105-*a*, the UE may determine that the beam has failed based on the BFD procedure. As such, the UE may initiate the BFR procedure based on the determining, resulting in increased power consumption and decreased communication latency.

Techniques described herein may support enhanced BFD in the wireless communications system 200. For example, the UE 115-*a* may perform a beam blocking prediction procedure based on a control message 215 (e.g., transmitted via RRC, MAC CE, or DCI). The control message 215 may indicate a configuration associated with the beam blocking prediction procedure. For example, the control message 215 may include a set of parameters associated with the beam blocking prediction procedure. In some cases, the set of parameters may include a threshold quantity of consecutive beam BFI indicators, a machine learning model, one or more parameters associated with the machine learning model, a prediction method indicator, or any combination thereof. In some cases, the UE 115-*a* may be pre-configured with one or more parameters of the set of parameters associated with the beam blocking prediction procedure.

In some cases, the UE 115-*a* may perform the beam blocking prediction procedure based on a pattern of BFIs, such as quantity of consecutive BFIs (e.g., BFI indicators). For example, the UE 115-*a* may monitor the BFD-RSs 230 and may generate BFI indicators corresponding to one or more of the BFD-RSs 230 as part of a BFD procedure. Further, the UE 115-*a* may count the BFI indicators and may detect a quantity of consecutive BFI indicators. In some cases, the quantity of consecutive BFI indicators may be greater than a threshold quantity of consecutive BFI indicators (e.g., indicated in the control message 215. As such, the UE 115-*a* may determine a blocking prediction based on the quantity of consecutive BFI indicators exceeding the threshold quantity. Further, the threshold quantity may be preconfigured at the UE 115-*a* or configured via the control message 215.

In some cases, the UE 115-*a* may perform the beam blocking prediction procedure based on a ML model (e.g., neural network(s), prediction models, or the like). For example, the UE 115-*a* may monitor the BFD-RSs 230 and determine a set of parameters associated with the monitoring. For example, the set of parameters my include a SINR, a reference signal received power (RSRP), a SNR, a pathloss measurement, a quantity of BFI indicators detected by the UE 115-*a*, a quantity of available preambles for performing a CFRA procedure, or a combination thereof. The UE 115-*a* may input the set of parameters into the ML model and the ML model may output a blocking prediction. In some cases, the blocking prediction may include at least one of an indication of whether or not blocking may occur, a duration associated with a blocking prediction, or the like. Further, the ML model and associated parameters may be preconfigured at the UE 115-*a* or configured via the control message 215.

In some cases, the UE 115-*a* may switch between beam blocking prediction methods (e.g., pausing of counting or pausing of the monitoring), for example, based on information contained in the control message 215. For example, the control message 215 may include a prediction method indicator, indicating the beam blocking prediction method to be used by the UE 115-*a*. Additionally or alternatively, the UE 115-*a* may be preconfigured with one or both of the beam blocking prediction methods (e.g., RRC configuration).

Additionally, or alternatively, the UE 115-*a* may modify the BFD procedure based on a blocking prediction determine via the beam blocking prediction procedure. In some cases, the UE 115-*a* may pause counting of BFIs (e.g., BFI indicators) based on the blocking prediction, as described with respect to FIG. 3B. For example, the UE 115-*a* may determine the blocking prediction and a predicted blocking period associated with the blocking prediction. During the predicted blocking period, the network entity 105-*a* may continue to transmit BFD-RSs 230, however, the UE 115-*a* may pause counting of the BFIs associated with the BFD-RSs 230 (e.g., pause counting on the MAC layer). For example, the UE 115-*a* may refrain from generating or counting BFI indicators associated with BFD-RSs 230 with signal qualities less than the threshold signal quality during the predicted blocking period. The UE 115-*a* may resume counting of the BFIs after the predicted blocking period.

Figure 4:
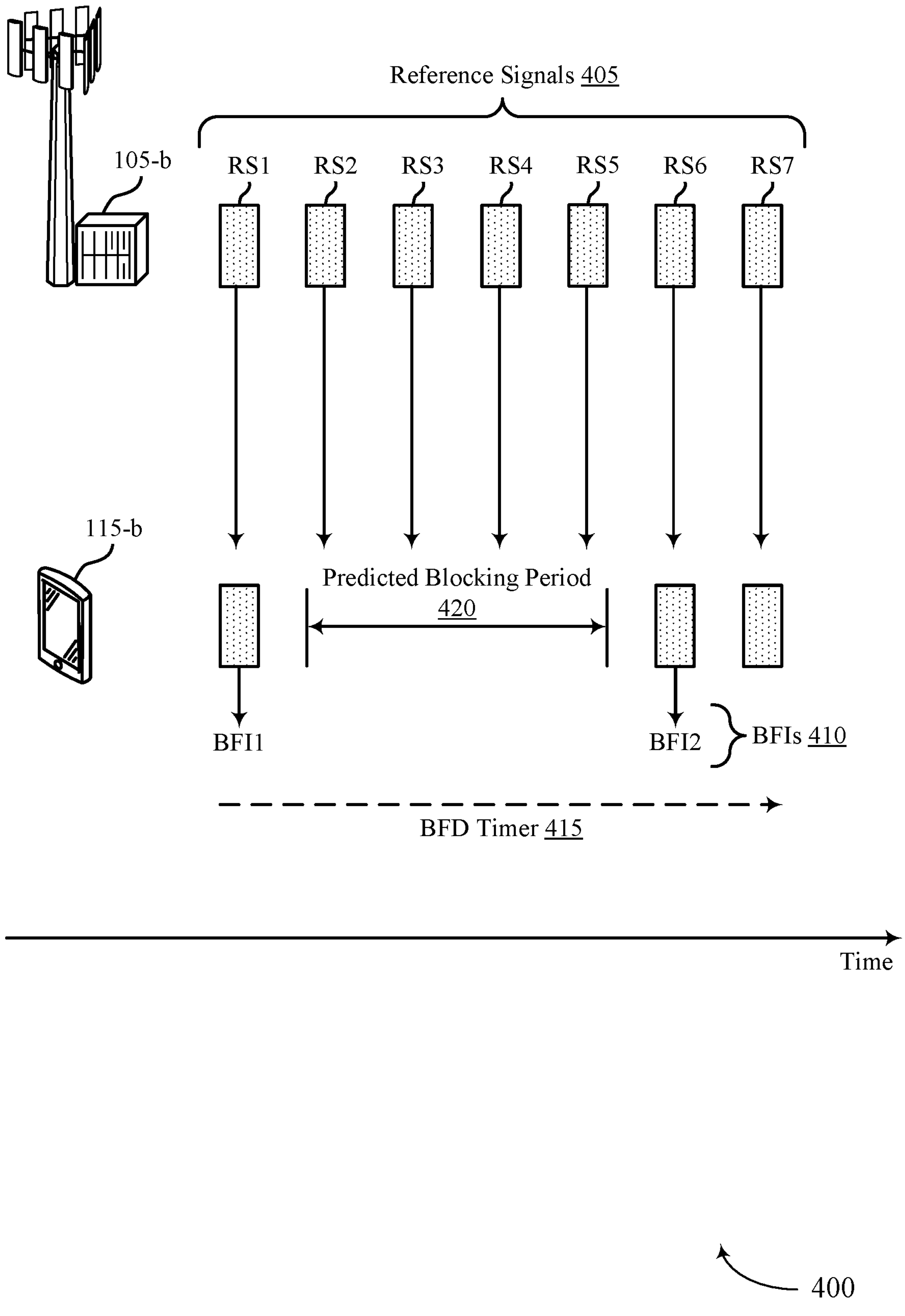
FIG. 4 illustrates an example of a communication sequences that supports enhanced BFD in accordance with one or more aspects of the present disclosure.

In some other cases, the UE 115-*a* may pause the monitoring for BFD-RSs 230 based on the blocking prediction, as described with respect to FIG. 4. For example, the UE 115-*a* may determine the blocking prediction and a predicted blocking period associated with the blocking prediction. During the predicted blocking period, the network entity 105-*a* may continue to transmit BFD-RSs 230, however, the UE 115-*a* may pause the monitoring for the BFD-RSs during the predicted blocking period (e.g., pause monitoring on the PHY layer). For example, the UE 115-*a* may refrain from monitoring or measuring the BFD-RSs 30 during the predicted blocking period. The UE 115-*a* may resume the monitoring for the BFD-RSs 230 after the predicted blocking period.

In some cases, the UE 115-*a* may transmit a request message 235 requesting activation of a beam blocking prediction procedure, a modified BFD procedure, or both (e.g., via MAC CE or uplink control information (UCI)). In some cases, the UE 115-*a* may request activation based on a quality of service (QoS) parameter, a power restraint parameter of the UE (e.g., a battery limit), a capacity associated with the UE, one or more parameters associated with a discontinuous cycle (e.g., discontinuous reception (DRX) cycle), of the UE, or any combination thereof. For example, the UE 115-*a* may be operating in a low power mode and may request activation of the modified BFD procedure associated with the pausing of the monitoring for the BFD-RSs 230 (e.g., to save power). In some cases, the network entity 105-*a* may transmit an activation message 240 (e.g., via MAC CE or DCI) activating the beam blocking prediction procedure, the modified BFD procedure, or both, based on the request message 215. In some case, the network entity 105-*a* may transmit the activation message 240 without receiving the request message 235.

In some cases, the UE 115-*a* may transmit the request message 235 requesting deactivation of a beam blocking prediction procedure, a modified BFD procedure, or both (e.g., via MAC CE or uplink control information (UCI)). In some cases, the UE 115-*a* may request deactivation based on a quality of service (QoS) parameter, a power restraint parameter of the UE, a capacity associated with the UE, one or more parameters associated with a discontinuous cycle (e.g., length of the DRX cycle, the on duration, the off duration, or the like), of the UE, or any combination thereof. For example, the UE 115-*a* may be operating according to a high QoS threshold and may request deactivation of the beam blocking prediction procedure and modified BFD procedure (e.g., to support increased availability). In another example, the UE 115-*a* may request deactivation of the beam blocking prediction procedure and modified BFD procedure based on the off duration of a DRX cycle associated with the UE 115-*a*. In some cases, the network entity 105-*a* may transmit a deactivation message 245 (e.g., via MAC CE or DCI) deactivating the beam blocking prediction procedure, the modified BFD procedure, or both, based on the request message 235. In some case, the network entity 105-*a* may transmit the deactivation message 245 without receiving the request message 235.

Figure 3A:
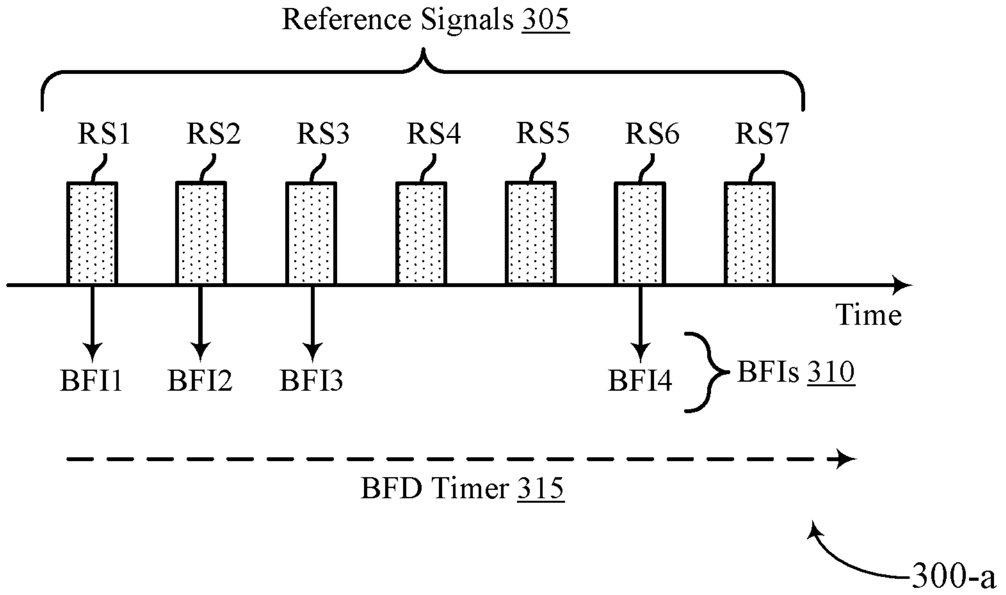
FIGS. 3A and 3B illustrates an example of communication sequences that support enhanced BFD in accordance with one or more aspects of the present disclosure.

FIG. 3A illustrates an example of a communication sequence 300-*a* that supports enhanced BFD in accordance with one or more aspects of the present disclosure. The communication sequence 300-*a* may implement or be implemented by aspects of the wireless communications system 100 or the wireless communications system 200 described with reference to FIGS. 1 and 2. For example, the communication sequence 300-*a* may be implemented by a UE 115 and a network entity 105 to support performing beam blocking prediction procedures.

The communication sequence 300-*a* depicts reference signals 305 that may be transmitted by the network entity 105 to the UE 115 as part of a BFD procedure. For example, the reference signals 305 may include reference signals RS1, RS2, RS3, RS4, RS5, RS6, and RS7, which may be examples of BFD-RSs (such as CSI-RSs or SSBs). The network entity 105 may periodically transmit each reference signal 305 in a respectively configured time period.

As part of the BFD procedure, the UE 115 may generate BFIs 310 (e.g., BFI indicators 310) in response to receiving the reference signals 305. For example, for each reference signal 305, the UE 115 may determine whether to generate a BFI 310 corresponding to the reference signal 305 (such as in response to determining that an estimated BLER of the reference signal 305 meets or exceeds a threshold BLER). For example, as described with reference to FIGS. 1 and 2, the UE 115 may measure an SINR of the reference signal 305 and estimate a BLER of the reference signal using the SINR measurement. If the estimated BLER of the reference signal meets or exceeds a threshold BLER, a PHY layer at the UE 115 may generate and report the BFI 310 to a MAC layer at the UE 115, which may track (such as count) a quantity of reported BFIs 310. In the example of FIG. 3A, the UE 115 may generate a BFI1 corresponding to the RS1, a BFI2 corresponding to the RS2, a BFI3 corresponding to the RS4, and a BFI4 corresponding to the RS6.

The UE 115 may perform the BFD procedure in accordance with a BFD timer 315. For example, the UE 115 may initiate the BFD timer 315 in response to receiving the RS1. The UE 115 may determine whether beam failure occurs based on the quantity of BFIs 310 generated within a duration of the BFD timer 315. For example, the UE 115 may be configured with a threshold corresponding to a threshold quantity of BFIs 310 that indicates an occurrence of beam failure. If the UE 115 generates at least the threshold quantity of BFIs 310 (such as four BFIs 310, or some other quantity of BFIs 310) before an expiration of the BFD timer 315, the UE 115 may ascertain or determine that beam failure has occurred, as described with reference to FIGS. 1 and 2. Otherwise, the UE 115 may ascertain or determine that beam failure has not occurred, as described with reference to FIGS. 1 and 2. Accordingly, in the example of FIG. 3A, the UE 115 may ascertain or determine that beam failure has occurred due to generating four BFIs 310 (for example, BF1 through BFI4) before the expiration of the BFD timer 315.

In some cases, the UE 115 may determine a blocking prediction based on detecting a quantity of consecutive BFIs 310 greater than a threshold quantity of consecutive BFIs 310. For example, the threshold quantity of consecutive BFIs 310 may be equal to 2. As such, the UE 115 may detect BFI1, BFI2, and BFI3 (e.g., 3 consecutive BFIs 310) and determine a blocking prediction based on the detected quantity of consecutive BFIs 310 exceeding the threshold quantity. In another example, the threshold quantity of consecutive BFIs 310 may be equal to 4. As such, the UE 115 may detect BFI1, BFI2, and BFI3 (e.g., 3 consecutive BFIs 310) and refrain from determining a blocking prediction based on the detected quantity of consecutive BFIs 310 failing to exceed the threshold quantity.

In some other cases, the UE 115 may determine a blocking prediction based on a ML model. For example, the UE 115 may determine a set of parameters associated with the reference signals 305 and input the set of parameters into a ML model. The ML model may output whether or not a blocking is occurring or may occur. As an illustrative example, the UE 115 may monitor RS1 thru RS3 and determine a set of parameters associated with RS1, RS2, and RS3, such as a respective SNR for each reference signal 305. The UE 115 may input the set of parameters into the ML model and the ML model may output a blocking prediction.

Figure 3B:
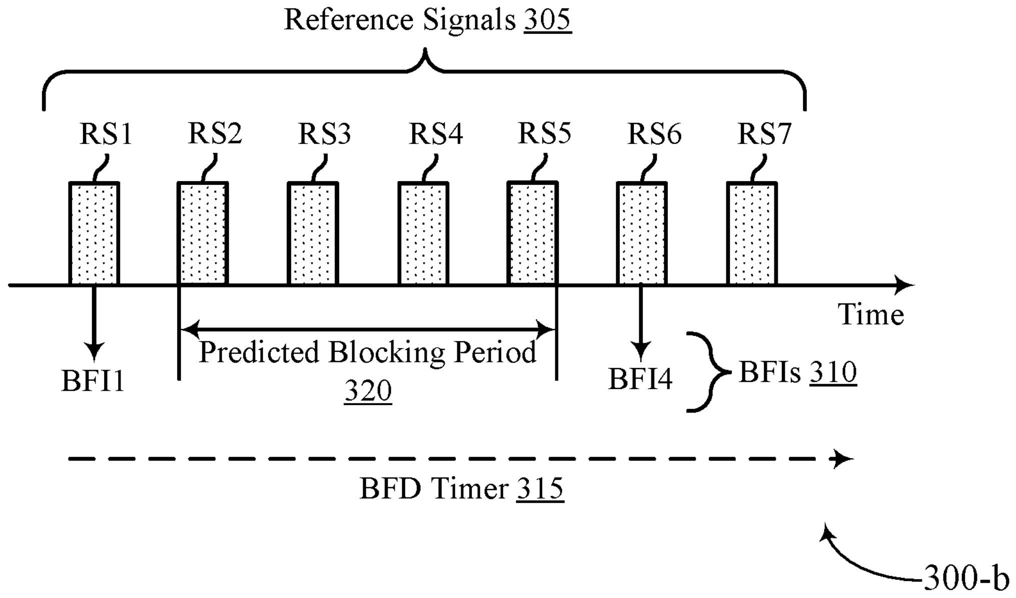

FIG. 3B illustrates an example of a communication sequence 300-*b* that supports enhanced BFD in accordance with one or more aspects of the present disclosure. The communication sequence 300-*b* may implement or be implemented by aspects of the wireless communications system 100 or the wireless communications system 200 described with reference to FIGS. 1 and 2. For example, the communication sequence 300-*b* may be implemented by a UE 115 and a network entity 105 to support enhanced BFD procedures.

The communication sequence 300-*b* depicts an enhanced, or modified, BFD procedure performed by the UE 115 in response to a blocking prediction (for example, based on a beam blocking prediction procedure as described with reference to FIGS. 1, 2 and 3A). The UE 115 may perform the modified BFD procedure in accordance with a blocking prediction determined by the UE 115, for example, as determined based on a quantity of consecutive BFIs 310 (e.g., BFI indicators 310) exceeding a threshold or based on an output of a ML model. In some examples, the UE 115 may determine a blocking prediction associated with a predicted blocking period 320 and the UE 115 may pause counting of BFIs 310 detected by the UE 115 during the predicted blocking period 320. For example, the UE 115 may initiate the BFD timer 315 in response to receiving the RS1 and generating the BFI1. During the predicted blocking period 320 the network entity 105 may transmit reference signals 305, such as RS2, RS3, RS4, and RS5, and the UE 115 may monitor for the reference signals 305. In some examples, the UE 115 may determine one or more channel measurements on the reference signals 305 received during the predicted blocking period 320. However, the UE 115 may pause reporting (e.g., counting) of BFIs 310 during the predicted blocking period 320. For example, the UE 115 may not count BFI2 and BFI2 during the blocking period 320. Additionally, or alternatively, the UE 115 may resume reporting of BFIs 310 after the predicted blocking period 320. For example, the UE 115 may generate BFI4 after the predicted blocking period 320, however, the UE 115 may count the BFI4 as the second BFI 310 detected during the duration of the BFD time 315. Therefore, the UE 115 may ascertain or determine that beam failure has not occurred due to generating two BFIs 310 (for example, BF1 and BFI4) before the expiration of the BFD timer 315. Pausing counting of BFIs 310 during the predicted blocking period 320 may result in reduced power consumption, reduced latency, and increased BFD detection accuracy (e.g., due to avoiding unnecessary beam failure declarations due to temporary blocking).

FIG. 4 illustrates an example of a communication sequence 400 that supports enhanced BFD in accordance with one or more aspects of the present disclosure. The communication sequence 400 may implement or be implemented by aspects of the wireless communications system 100 or the wireless communications system 200 described with reference to FIGS. 1 and 2. For example, the communication sequence 400 may be implemented by a UE 115-*b* and a network entity 105-*b* to support enhanced BFD procedures.

The communication sequence 400 depicts an enhanced, or modified, BFD procedure performed by the UE 115-*b* in response to a blocking prediction (for example, based on a beam blocking prediction procedure as described with reference to FIGS. 1, 2 and 3A). The UE 115-*b* may perform the modified BFD procedure in accordance with a blocking prediction determined by the UE 115-*b*, for example, as determined based on a quantity of consecutive BFIs 410 (e.g., BFI indicators 410) exceeding a threshold or based on an output of a ML model. In some examples, the UE 115-*b* may determine a blocking prediction associated with a predicted blocking period 420 and the UE 115-*b* may pause the monitoring for the reference signals 405 during the predicted blocking period 420. For example, the UE 115-*b* may initiate the BFD timer 415 in response to receiving the RS1 and generating a BFI1. During the predicted blocking period 420 the network entity 105-*b* may transmit reference signals 405, such as RS2, RS3, RS4, and RS5, and the UE 115-*b* may refrain from monitoring for the reference signals 405. For example, the UE 115-*b* may not monitor for RS2, RS3, RS4, and RS5 during the blocking period 420. Additionally, or alternatively, the UE 115-*b* may resume monitoring for the reference signals 405 after the predicted blocking period 420. For example, the UE 115-*b* may monitor for RS6 and RS7 after the predicted blocking period 420. As such, the UE 115-*b* may generate a BFI2 based on RS6. Pausing the monitoring for the reference signals 405 during the predicted blocking period 420 may result in reduced power consumption, reduced latency, and increased BFD detection accuracy (e.g., due to avoiding unnecessary beam failure declarations due to temporary blocking).

Figure 5:
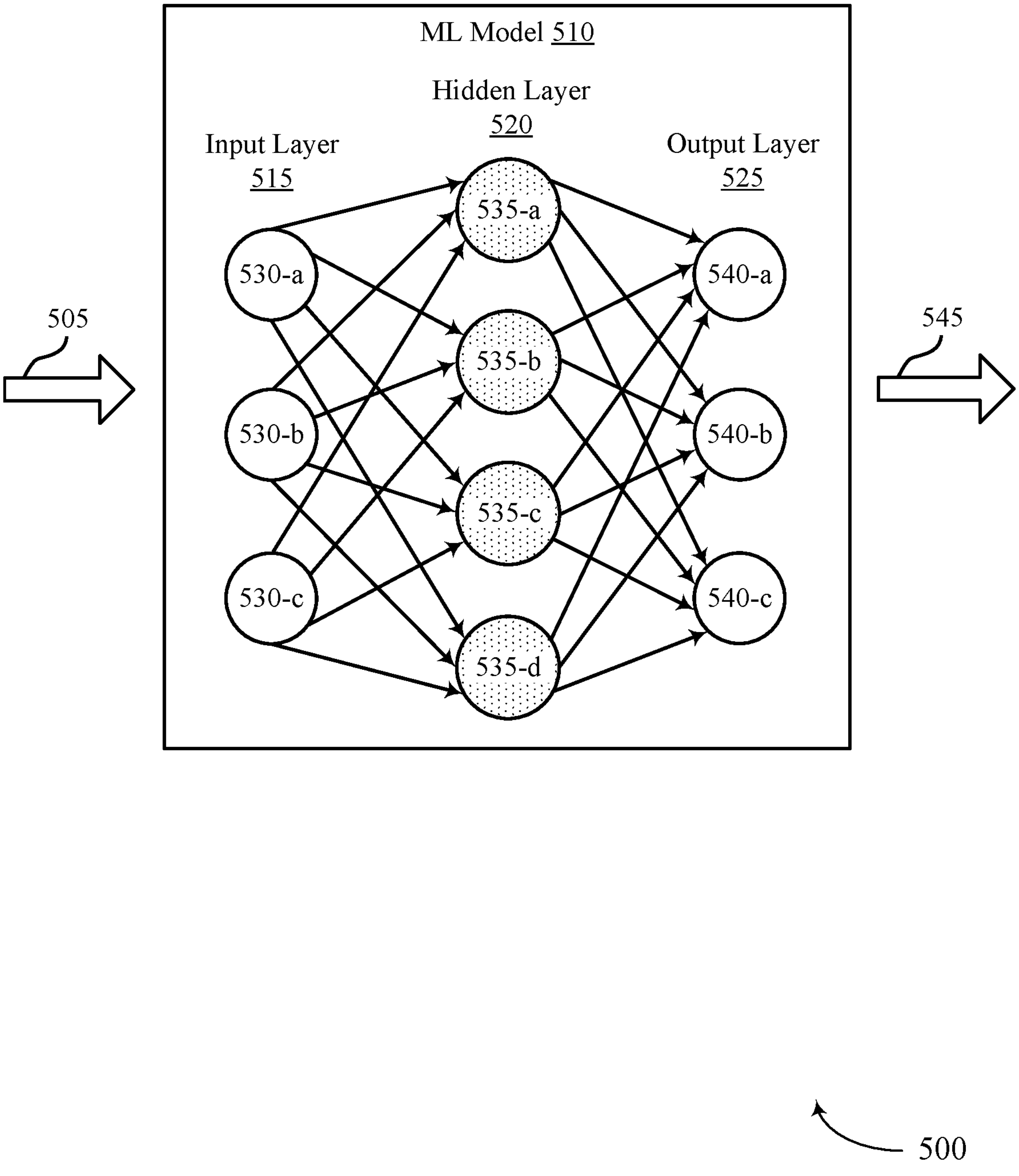
FIG. 5 illustrates an example of a machine learning (ML) process that supports enhanced BFD in accordance with one or more aspects of the present disclosure.

FIG. 5 illustrates an example of a ML process 500 that supports enhanced BFD in accordance with one or more aspects of the present disclosure. The ML process 500 may be implemented at a wireless device, such as a UE 115 as described herein, including with reference to FIGS. 1-4. The ML process 500 may include a ML model 510. In some implementations, the wireless device may receive a neural network model from a network entity 105 (as described herein, including with reference to FIGS. 1-4) and implement one or more ML models 510 as part of the neural network model to optimize communication processes.

As illustrated, the ML model 510 may be an example of a neural network, such as a feed forward (FF) or deep feed forward (DFF) neural network, a recurrent neural network (RNN), a long/short term memory (LSTM) neural network, a convolutional neural network (CNN), or any other type of neural network. However, any other ML models may be supported by the UE 115. For example, the ML model 510 may implement a nearest neighbor algorithm, a linear regression algorithm, a Naïve Bayes algorithm, a random forest algorithm, or any other ML model. Further, the ML process 500 may involve supervised learning, unsupervised learning, semi-supervised learning, reinforcement learning, or any combination thereof. The ML may be performed prior to deployment of a UE 115, while the UE 115 is deployed, during low usage periods of the UE 115 while the UE 115 is deployed, or any combination thereof.

The ML model 510 may include an input layer 515, one or more hidden layers 520, and an output layer 525. In a fully connected neural network with one hidden layer 520, each hidden layer node 535 may receive a value from each input layer node 530 as input, where each input is weighted. These neural network weights may be based on a cost function that is revised during training of the ML model 510. Similarly, each output layer node 550 may receive a value from each hidden layer node 535 as input, where the inputs are weighted. If post-deployment training (such as online training) is supported at a UE 115, the UE 115 may allocate memory to store errors or gradients for reverse matrix multiplication. These errors or gradients may support updating the ML model 510 based on output feedback. Training the ML model 510 may support computation of the weights (such as connecting the input layer nodes 530 to the hidden layer nodes 535 and the hidden layer nodes 535 to the output layer nodes 550) to map an input pattern to a desired output outcome. This training may result in a UE-specific ML model 510 based on the historic application data and data transfer for a specific UE 115.

The UE 115 may send input values 505 to the ML model 510 for processing. In some example, the UE 115 may perform preprocessing according to a sequence of operations received from the network entity 105 on the input values 505 such that the input values 505 may be in a format that is compatible with the ML model 510. The input values 505 may be converted into a set of k input layer nodes 530 at the input layer 515. In some implementations, different measurements may be input at different input layer nodes 530 of the input layer 515. Some input layer nodes 530 may be assigned default values (such as values of 0) if the number of input layer nodes 530 exceeds the number of inputs corresponding to the input values 505. As illustrated, the input layer 515 may include three input layer nodes 530-*a*, 530-*b*, and 530-*c*. However, it is to be understood that the input layer 515 may include any number of input layer nodes 530 (such as 20 input layer nodes 530, or some other number of input layer nodes 530).

The ML model 510 may convert the input layer 515 to a hidden layer 520 based on a number of input-to-hidden weights between the k input layer nodes 530 and then hidden layer nodes 535. The ML model 510 may include any number of hidden layers 520 as intermediate steps between the input layer 515 and the output layer 525. Additionally, or alternatively, each hidden layer 520 may include any number of nodes. For example, as illustrated, the hidden layer 520 may include four hidden layer nodes 535-*a*, 535-*b*, 535-*c*, and 535-*d*. However, it is to be understood that the hidden layer 520 may include any number of hidden layer nodes 535 (such as 10 hidden layer nodes 535, or some other number of hidden layer nodes 535). In a fully connected neural network, each node in a layer may be based on each node in the previous layer. For example, the value of hidden layer node 535-*a* may be based on the values of input layer nodes 530-*a*, 530-*b*, and 530-*c* (such as with different weights applied to each node value).

The ML model 510 may determine values for the output layer nodes 550 of the output layer 525 following one or more hidden layers 520. For example, the ML model 510 may convert the hidden layer 520 to the output layer 525 based on a number of hidden-to-output weights between the n hidden layer nodes 535 and the m output layer nodes 550. In some implementations, n=m. Each output layer node 550 may correspond to a different output value 545 of the ML model 510. As illustrated, the ML model 510 may include three output layer nodes 540-*a*, 540-*b*, and 540-*c*, supporting three different output values associate with blocking prediction. However, it is to be understood that the output layer 525 may include any number of output layer nodes 540 (such as 10 output layer nodes 540, or some other number of output layer nodes 540).

In some implementations, a UE 115 may utilize a neural network model based on the ML model 510, which may be used to perform a beam blocking prediction procedure, as described with reference to FIGS. 2 and 3A.

Figure 6:
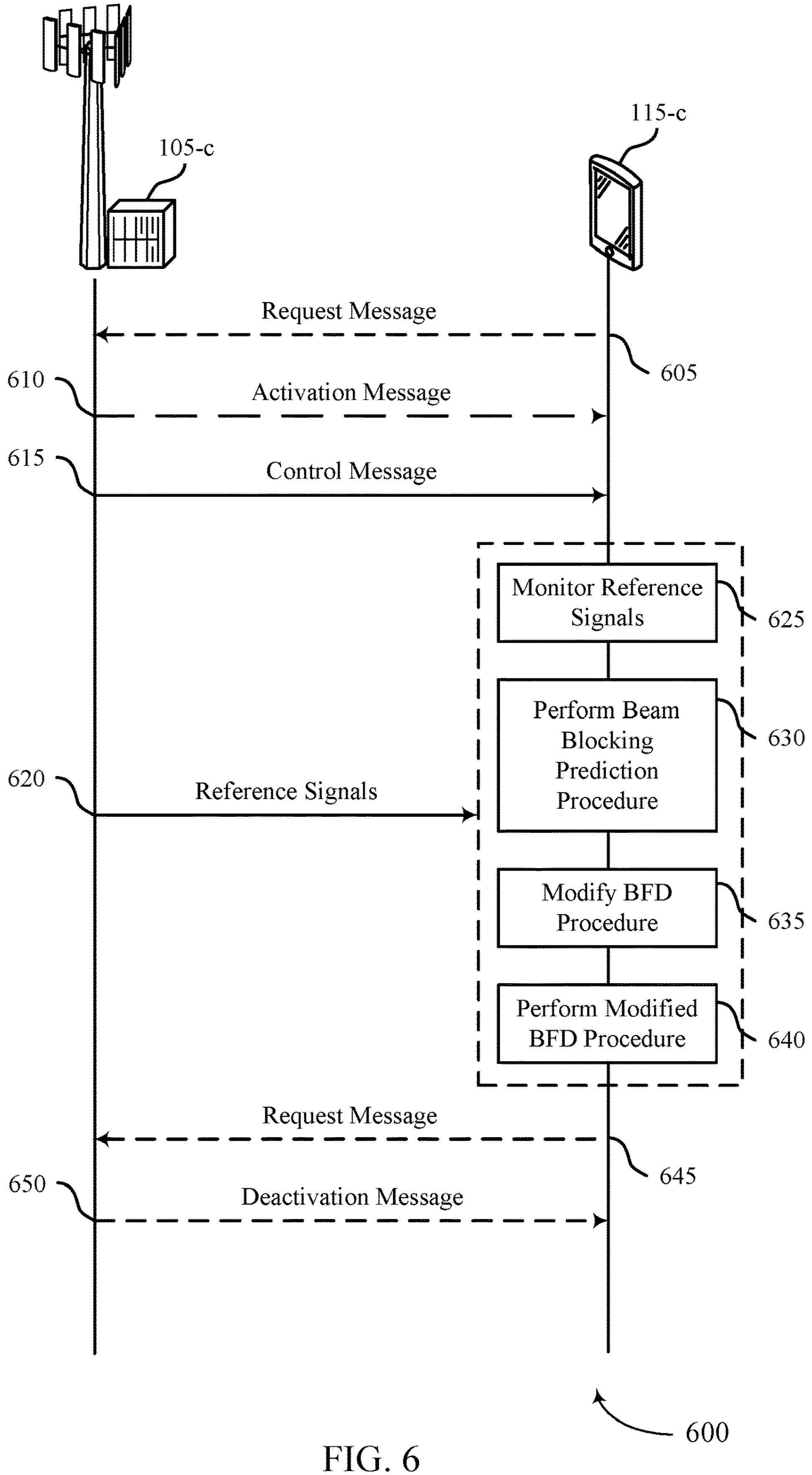
FIG. 6 illustrates an example of a process flow that supports enhanced BFD in accordance with one or more aspects of the present disclosure.

FIG. 6 illustrates an example of a process flow 600 that supports enhanced BFD in accordance with one or more aspects of the present disclosure. The process flow 600 may implement or may be implemented by aspects of the wireless communications system 100 and the wireless communications system 200 described with reference to FIGS. 1 and 2. For example, the process flow 600 may be implemented by a UE 115-*c* and a network entity 105-*c* to support enhanced BFD procedures.

In some cases, at 605, a UE 115-*c* may transmit a request message requesting activation of a beam blocking prediction procedure, a modified BFD procedure, or both. In some cases, the UE 115-*a* may request activation of the beam blocking prediction procedure, the modified BFD procedure, or both, based on a QoS parameter, a power restraint parameter of the UE, a capacity associated with the UE, one or more parameters associated with a discontinuous cycle of the UE, or any combination thereof.

In some cases, at 610, the network entity 105-*c* may transmit an activation message activating the beam blocking prediction procedure, the modified BFD procedure, or both. In some cases, the activation message may be based on the request message requesting activation. In some other cases, the network entity 105-*c* may transmit the activation message without receiving the request message. The UE 115-*c* may activate beam blocking prediction procedure, the modified BFD procedure, or both based on the activation message.

At 615, the network entity may transmit a message indicating a configuration associated with the beam blocking prediction procedure for the UE 115-*a*. In some cases, the message may include a set of parameters associated with the beam blocking prediction procedure. The set of parameters may include a threshold quantity of consecutive BFI indicators, a ML model, one or more parameters associated with the machine learning model, a prediction type parameter, a modification parameter, a configuration switch indicator, or any combination thereof.

At 620, the network entity 105-*c* may transmit one or more reference signals based on the configuration and a BFD procedure associated with the beam blocking prediction procedure. In some cases, the reference signals may include one or more BFD-RSs, CSI-RSs, or SSBs.

At 625, the UE 115-*c* may monitor the one or more reference signals and measure a signal quality of a first reference signal of the one or more reference signals. In some cases, the UE 115-*c* may detect a BFI (and generate a BFI indicator) for the first reference signal based on the signal quality being below a threshold quality. Additionally, or alternatively, the UE 115-*c* may initiate a timer associated with the BFD procedure based on the BFI and may count a quantity of BFIs (e.g., BFI indicators) during a duration associated with the procedure.

At 630, the UE 115-*c* may perform a beam blocking prediction procedure in accordance with the configuration transmitted in the control message. In some cases, the UE 115-*c* may determine a blocking prediction based on one or more BFI indicators (e.g., BFIs) detected by the UE 115-*c*. For example, the UE 115-*c* may detect a quantity of consecutive BFI indicators and determine the blocking prediction based on the quantity of consecutive beam failure instance indicators exceeding a threshold quantity. In some other, the UE 115-*c* may determine a blocking prediction based on a ML model. For example, the UE 115-*c* may input a set of parameters associated with the BFD procedure into the ML model. In some cases, the set of parameters may include a SINR, a RSRP, a SNR, a quantity of BFI indicators detected by the UE, a quantity of available preambles for performing a CFRA procedure, or a combination thereof.

At 635, the UE 115-*c* may modify the BFD procedure based on the blocking prediction determined via the beam blocking prediction procedure. In some cases, the UE 115-*c* may modify the BFD procedure based on an indication of a configuration switch included in the control message.

At 640, the UE 115-*c* may perform the modified BFD procedure. In some cases, the UE 115-*c* may pause the monitoring for the one or more reference signals during a blocking period associated with the blocking prediction. In some other cases, the UE 115-*c* may pause counting of BFI indicators detected by the UE 115-*c* during the blocking period associated with the blocking prediction. In either case, the UE 115-*c* may resume the monitoring or counting after the blocking period.

In some cases, at 645, the UE 115-*c* may transmit a request message requesting deactivation of the beam blocking prediction procedure, the modified BFD procedure or both. In some cases, the UE 115-*a* may request deactivation of the beam blocking prediction procedure, the modified BFD procedure, or both, based on a QoS parameter, a power restraint parameter of the UE, a capacity associated with the UE, one or more parameters associated with a discontinuous cycle of the UE, or any combination thereof.

In some cases, at 650, the network entity 105-*c* may transmit a deactivation message deactivating the beam blocking prediction procedure, the modified BFD procedure, or both. In some cases, the deactivation message may be based on the request message requesting deactivation. In some other cases, the network entity 105-*c* may transmit the deactivation message without receiving the request message. The UE 115-*c* may deactivate beam blocking prediction procedure, the modified BFD procedure, or both based on the deactivation message.

Figure 7:
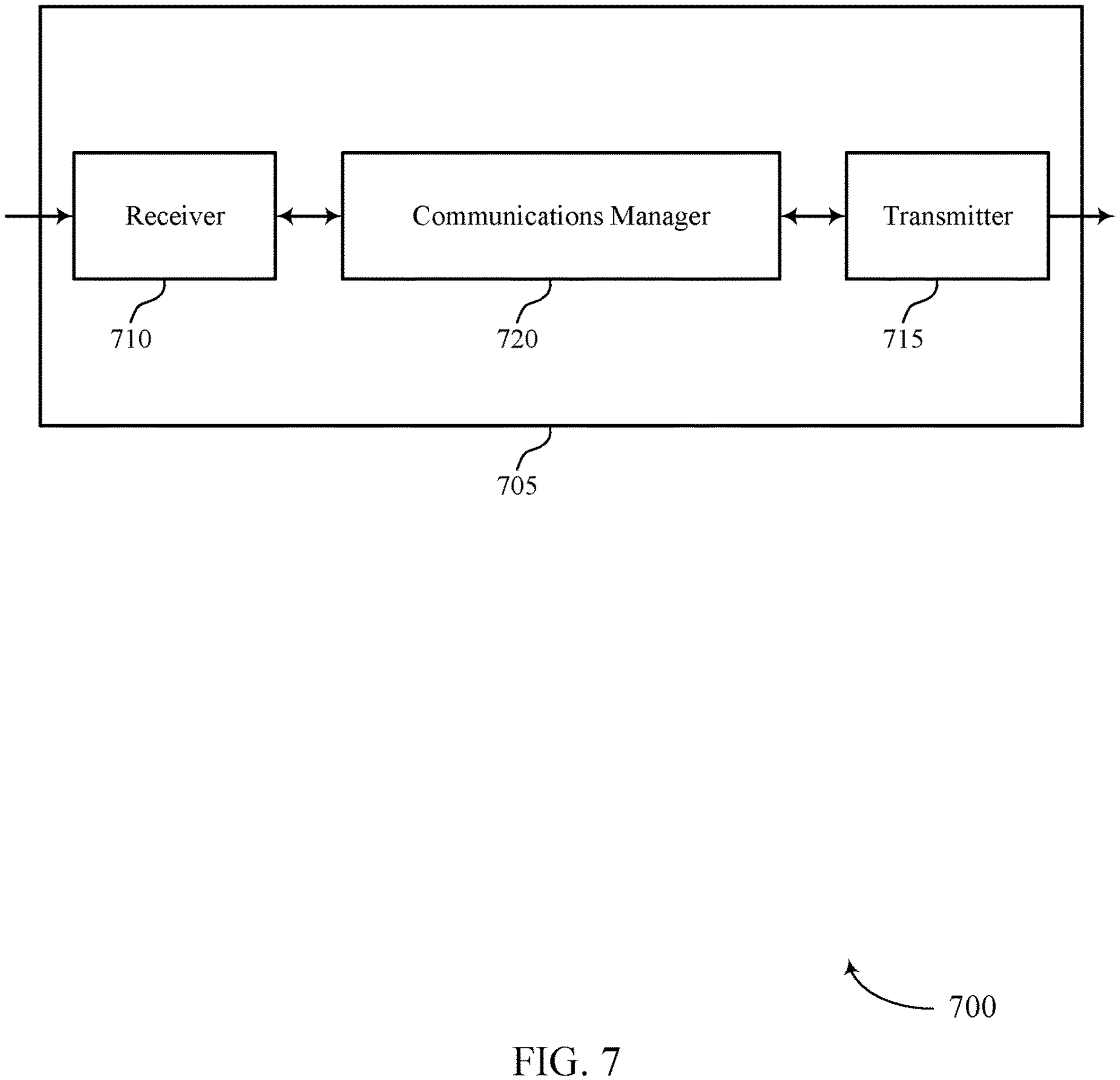
FIGS. 7 and 8 show block diagrams of devices that support enhanced BFD in accordance with one or more aspects of the present disclosure.

FIG. 7 shows a block diagram 700 of a device 705 that supports enhanced BFD in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhanced BFD). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhanced BFD). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of enhanced BFD as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving a message indicating a configuration associated with a beam blocking prediction procedure for the UE. The communications manager 720 may be configured as or otherwise support a means for monitoring for one or more reference signals based on the configuration and a BFD procedure associated with the beam blocking prediction procedure. The communications manager 720 may be configured as or otherwise support a means for performing the beam blocking prediction procedure in accordance with the configuration based on the monitoring for the one or more reference signals. The communications manager 720 may be configured as or otherwise support a means for modifying the BFD procedure based on a blocking prediction determined based on the beam blocking prediction procedure.

The communications manager 720 may be configured as or otherwise support a means for performing the modified BFD procedure based on the blocking prediction.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for enhanced BFD resulting in reduced processing, reduced power consumption, and more efficient utilization of communication resources, among other advantages.

Figure 8:
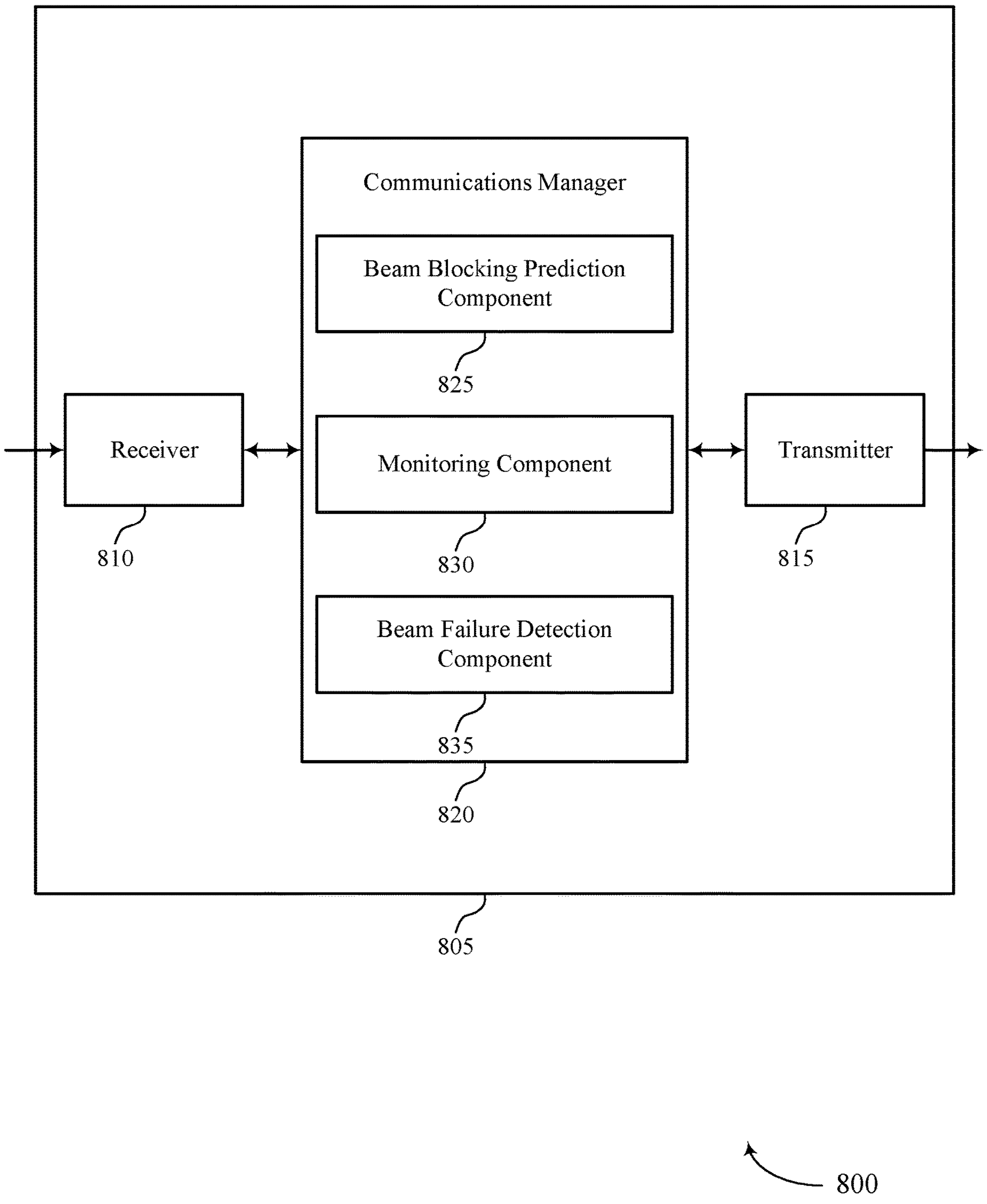

FIG. 8 shows a block diagram 800 of a device 805 that supports enhanced BFD in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to enhanced BFD). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhanced BFD). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of enhanced BFD as described herein. For example, the communications manager 820 may include a beam blocking prediction component 825, a monitoring component 830, a BFD component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The beam blocking prediction component 825 may be configured as or otherwise support a means for receiving a message indicating a configuration associated with a beam blocking prediction procedure for the UE. The monitoring component 830 may be configured as or otherwise support a means for monitoring for one or more reference signals based on the configuration and a BFD procedure associated with the beam blocking prediction procedure. The beam blocking prediction component 825 may be configured as or otherwise support a means for performing the beam blocking prediction procedure in accordance with the configuration based on the monitoring for the one or more reference signals. The BFD component 835 may be configured as or otherwise support a means for modifying the BFD procedure based on a blocking prediction determined based on the beam blocking prediction procedure. The BFD component 835 may be configured as or otherwise support a means for performing the modified BFD procedure based on the blocking prediction.

Figure 9:
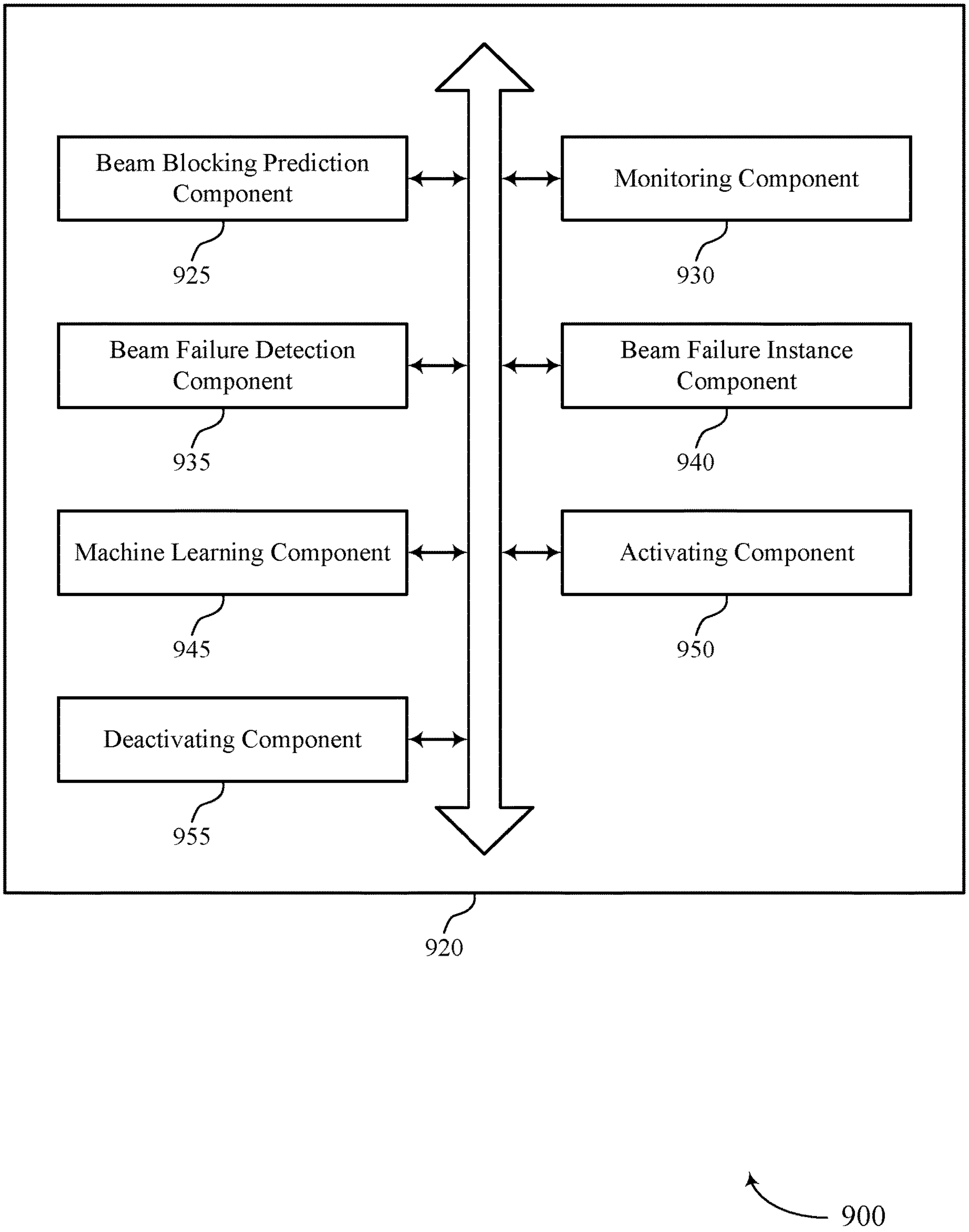
FIG. 9 shows a block diagram of a communications manager that supports enhanced BFD in accordance with one or more aspects of the present disclosure.

FIG. 9 shows a block diagram 900 of a communications manager 920 that supports enhanced BFD in accordance with one or more aspects of the present disclosure. The communications manager 920 may be an example of aspects of a communications manager 720, a communications manager 820, or both, as described herein. The communications manager 920, or various components thereof, may be an example of means for performing various aspects of enhanced BFD as described herein. For example, the communications manager 920 may include a beam blocking prediction component 925, a monitoring component 930, a BFD component 935, a beam failure instance component 940, a machine learning component 945, an activating component 950, a deactivating component 955, or any combination thereof. Each of these components may communicate, directly or indirectly, with one another (e.g., via one or more buses).

The communications manager 920 may support wireless communications at a UE in accordance with examples as disclosed herein. The beam blocking prediction component 925 may be configured as or otherwise support a means for receiving a message indicating a configuration associated with a beam blocking prediction procedure for the UE. The monitoring component 930 may be configured as or otherwise support a means for monitoring for one or more reference signals based on the configuration and a BFD procedure associated with the beam blocking prediction procedure. In some examples, the beam blocking prediction component 925 may be configured as or otherwise support a means for performing the beam blocking prediction procedure in accordance with the configuration based on the monitoring for the one or more reference signals. The BFD component 935 may be configured as or otherwise support a means for modifying the BFD procedure based on a blocking prediction determined based on the beam blocking prediction procedure. In some examples, the BFD component 935 may be configured as or otherwise support a means for performing the modified BFD procedure based on the blocking prediction.

In some examples, to support performing the beam blocking prediction procedure, the beam failure instance component 940 may be configured as or otherwise support a means for determining the blocking prediction based on one or more beam failure instance indicators detected by the UE.

In some examples, the beam failure instance component 940 may be configured as or otherwise support a means for detecting a quantity of consecutive beam failure instance indicators based on one or more measurements associated with the monitoring for the one or more reference signals, where determining the blocking prediction is based on the quantity of consecutive beam failure instance indicators exceeding a threshold quantity.

In some examples, to support performing the beam blocking prediction procedure, the machine learning component 945 may be configured as or otherwise support a means for determining the blocking prediction based on a machine learning model.

In some examples, to support determining the blocking prediction based on the machine learning model, the machine learning component 945 may be configured as or otherwise support a means for inputting a set of parameters associated with the BFD procedure into the machine learning model, where the set of parameters associated with the BFD procedure is based on the monitoring.

In some examples, the set of parameters associated with the BFD procedure includes a SINR, a RSRP, an SNR, a pathloss measurement, a quantity of BFI indicators detected by the UE, a quantity of available preambles for performing a CFRA procedure, or a combination thereof.

In some examples, to support performing the beam blocking prediction procedure, the beam blocking prediction component 925 may be configured as or otherwise support a means for performing the beam blocking prediction procedure based on a set of prediction parameters associated with the beam blocking prediction procedure, where the configuration associated with the beam blocking procedure indicates the set of prediction parameters.

In some examples, the set of prediction parameters includes a threshold quantity of consecutive beam failure instance indicators, a machine learning model, one or more parameters associated with the machine learning model, a prediction method indicator, or any combination thereof.

In some examples, to support modifying the BFD procedure, the BFD component 935 may be configured as or otherwise support a means for modifying the BFD procedure based on an indication of a configuration switch, where the configuration associated with the beam blocking procedure includes the indication of the configuration switch.

In some examples, to support performing the modified BFD procedure, the monitoring component 930 may be configured as or otherwise support a means for pausing the monitoring for the one or more reference signals during a blocking period associated with the blocking prediction. In some examples, to support performing the modified BFD procedure, the monitoring component 930 may be configured as or otherwise support a means for resuming the monitoring for the one or more reference signals after the blocking period.

In some examples, to support performing the modified BFD procedure, the beam failure instance component 940 may be configured as or otherwise support a means for pausing counting of beam failure instance indicators detected by the UE during a blocking period associated with the blocking prediction. In some examples, to support performing the modified BFD procedure, the beam failure instance component 940 may be configured as or otherwise support a means for resuming counting of beam failure instance indicators detected by the UE after the blocking period.

In some examples, the activating component 950 may be configured as or otherwise support a means for receiving an activation message instructing the UE to activate the beam blocking prediction procedure, the modified BFD procedure, or both, where the beam block prediction procedure, the modified BFD procedure, or both, are performed based on the activation message.

In some examples, the activating component 950 may be configured as or otherwise support a means for transmitting a request message requesting activation of the beam blocking prediction procedure, the modified BFD procedure, or both, where the activation message is received in response to the request message.

In some examples, activation of the beam blocking prediction procedure, the modified BFD procedure, or both, are based on a quality of service parameter, a power restraint parameter of the UE, a capacity associated with the UE, one or more parameters associated with a discontinuous cycle of the UE, or any combination thereof.

In some examples, the deactivating component 955 may be configured as or otherwise support a means for receiving a deactivation message instructing the UE to deactivate the beam blocking prediction procedure, the modified BFD procedure, or both. In some examples, the deactivating component 955 may be configured as or otherwise support a means for deactivating the beam blocking prediction procedure, the modified BFD procedure, or both, based on the deactivation message.

In some examples, the deactivating component 955 may be configured as or otherwise support a means for transmitting a request message requesting deactivation of the beam blocking prediction procedure, the modified BFD procedure, or both, where the deactivation message is received in response to the request message.

In some examples, deactivation of the beam blocking prediction procedure, the modified BFD procedure, or both, are based on a quality of service parameter, a power restraint parameter of the UE, a capacity associated with the UE, one or more parameters associated with a discontinuous cycle of the UE, or any combination thereof.

In some examples, the monitoring component 930 may be configured as or otherwise support a means for measuring a signal quality of a first reference signal of the one or more reference signals. In some examples, the beam failure instance component 940 may be configured as or otherwise support a means for detecting a beam failure instance for the first reference signal based on the signal quality being below a threshold quality.

In some examples, the BFD component 935 may be configured as or otherwise support a means for initiating a timer associated with the BFD procedure based on the beam failure instance. In some examples, the beam failure instance component 940 may be configured as or otherwise support a means for counting a quantity of beam failure instances during a duration associated with the timer.

In some examples, the one or more reference signals includes one or more BFD reference signals, channel state information reference signals, or synchronization signal blocks.

Figure 10:
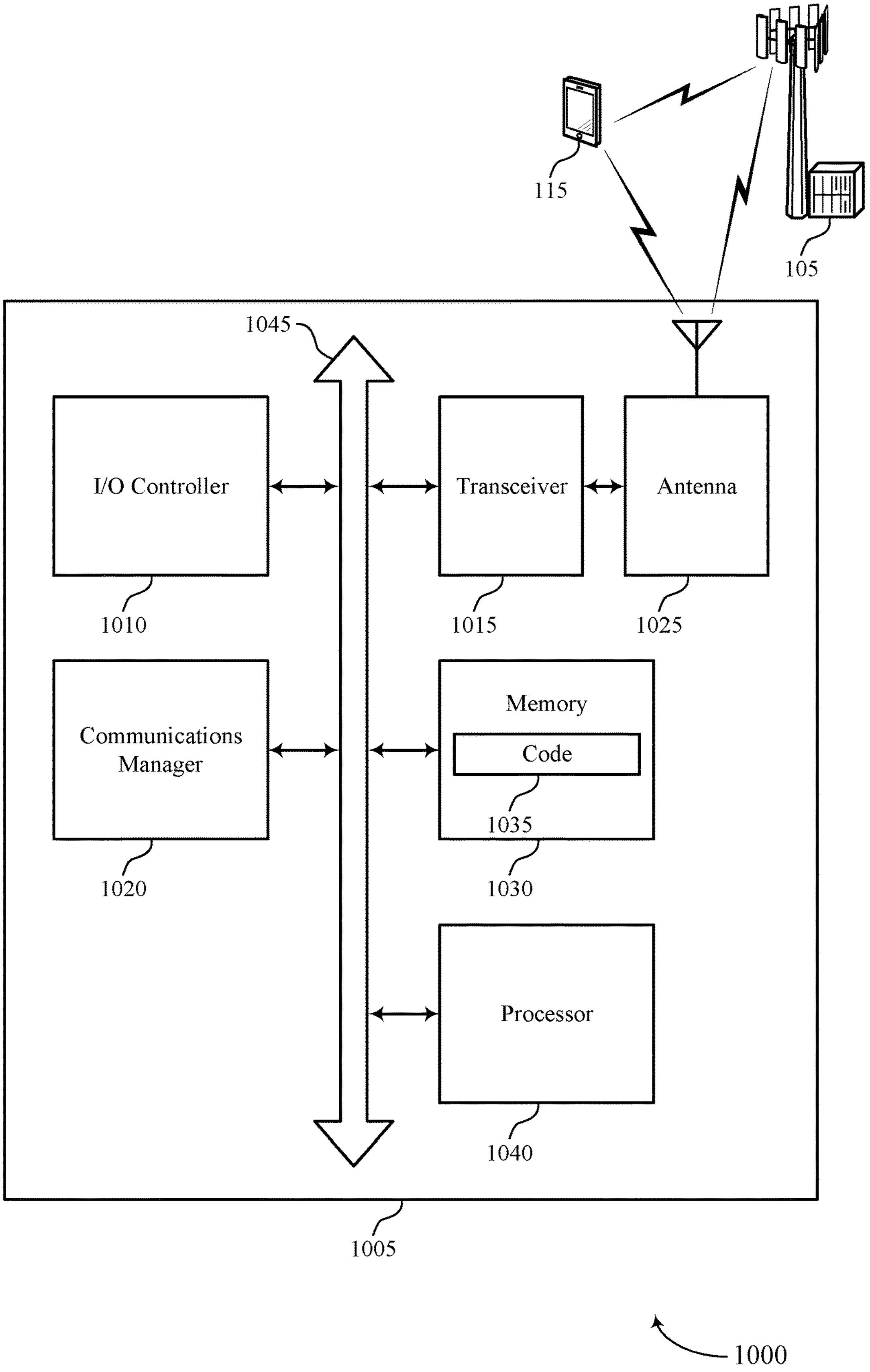
FIG. 10 shows a diagram of a system including a device that supports enhanced BFD in accordance with one or more aspects of the present disclosure.

FIG. 10 shows a diagram of a system 1000 including a device 1005 that supports enhanced BFD in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced BFD). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a message indicating a configuration associated with a beam blocking prediction procedure for the UE. The communications manager 1020 may be configured as or otherwise support a means for monitoring for one or more reference signals based on the configuration and a BFD procedure associated with the beam blocking prediction procedure. The communications manager 1020 may be configured as or otherwise support a means for performing the beam blocking prediction procedure in accordance with the configuration based on the monitoring for the one or more reference signals. The communications manager 1020 may be configured as or otherwise support a means for modifying the BFD procedure based on a blocking prediction determined based on the beam blocking prediction procedure. The communications manager 1020 may be configured as or otherwise support a means for performing the modified BFD procedure based on the blocking prediction.

By including or configuring the communications manager 1020 in accordance with examples as described herein, the device 1005 may support techniques for enhanced BFD resulting in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of enhanced BFD as described herein, or the processor 1040 and the memory 1030 may be otherwise configured to perform or support such operations.

Figure 11:
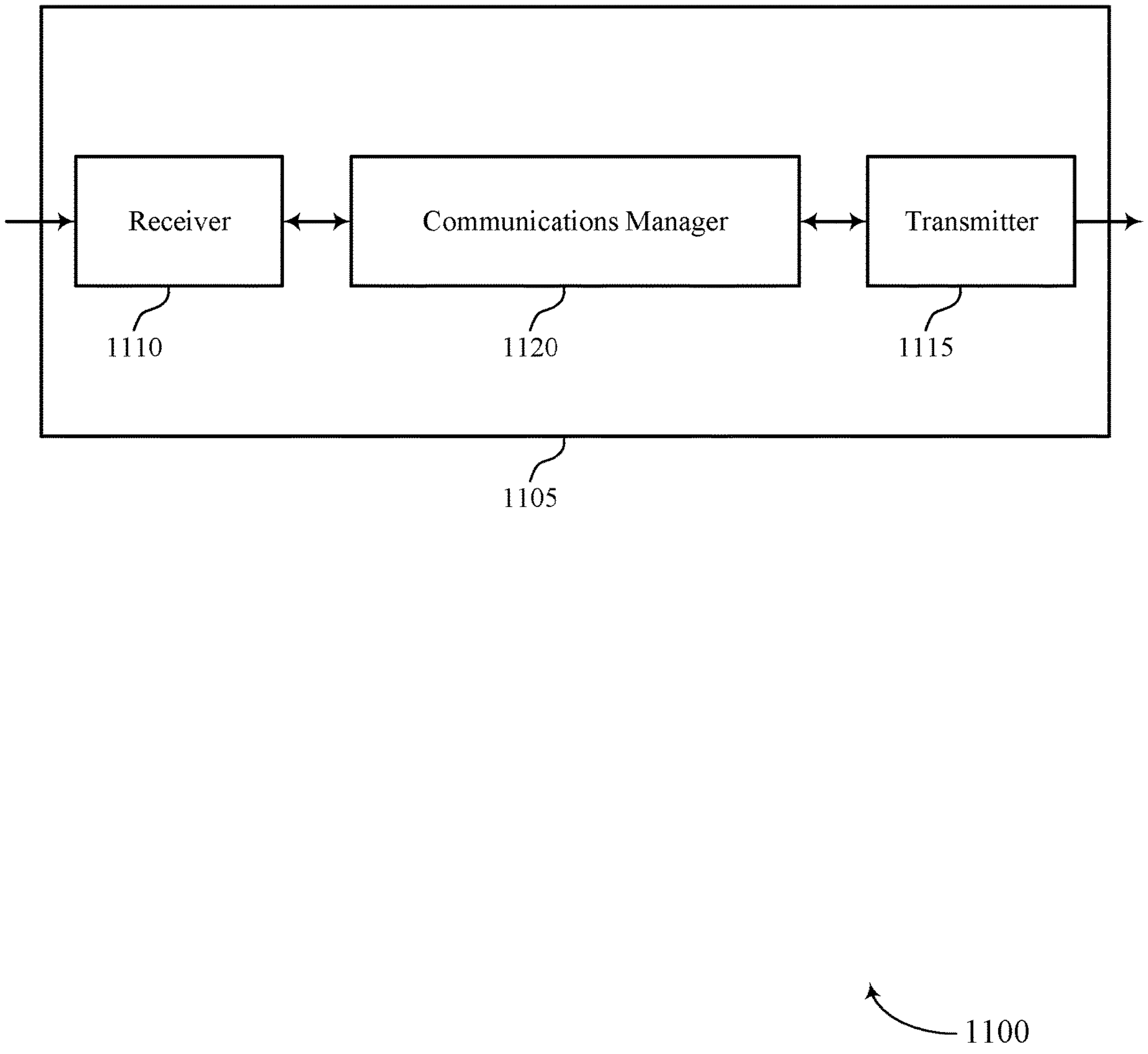
FIGS. 11 and 12 show block diagrams of devices that support enhanced BFD in accordance with one or more aspects of the present disclosure.

FIG. 11 shows a block diagram 1100 of a device 1105 that supports enhanced BFD in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of enhanced BFD as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting a message indicating a configuration associated with a beam blocking prediction procedure for a UE. The communications manager 1120 may be configured as or otherwise support a means for transmitting one or more reference signals based on the configuration and a BFD procedure associated with the beam blocking prediction procedure.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for enhanced BFD resulting in reduced processing, reduced power consumption, and more efficient utilization of communication resources, among other advantages.

Figure 12:
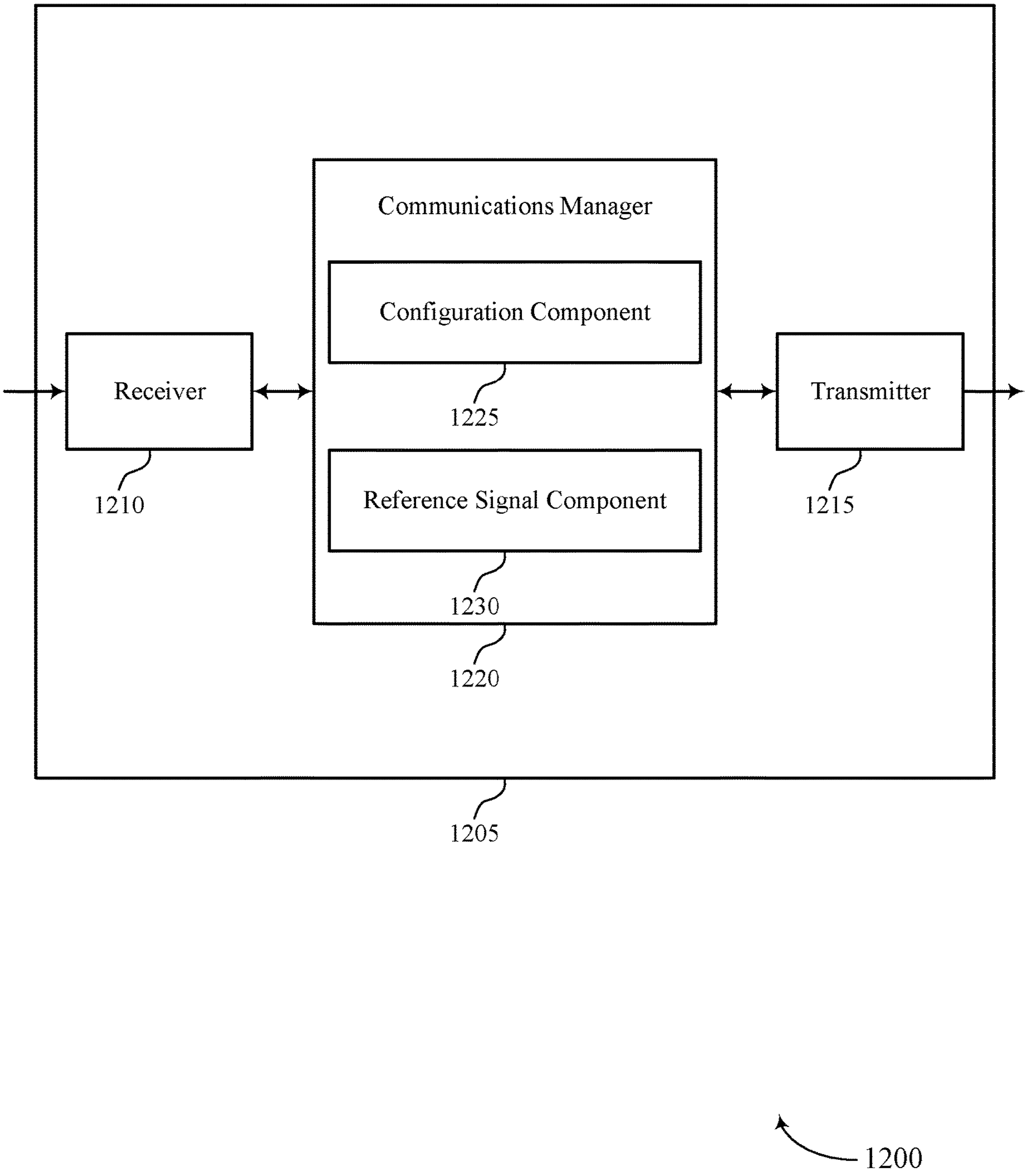

FIG. 12 shows a block diagram 1200 of a device 1205 that supports enhanced BFD in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of enhanced BFD as described herein. For example, the communications manager 1220 may include a configuration component 1225 a reference signal component 1230, or any combination thereof. The communications manager 1220 may be an example of aspects of a communications manager

1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The configuration component 1225 may be configured as or otherwise support a means for transmitting a message indicating a configuration associated with a beam blocking prediction procedure for a UE. The reference signal component 1230 may be configured as or otherwise support a means for transmitting one or more reference signals based on the configuration and a BFD procedure associated with the beam blocking prediction procedure.

Figure 13:
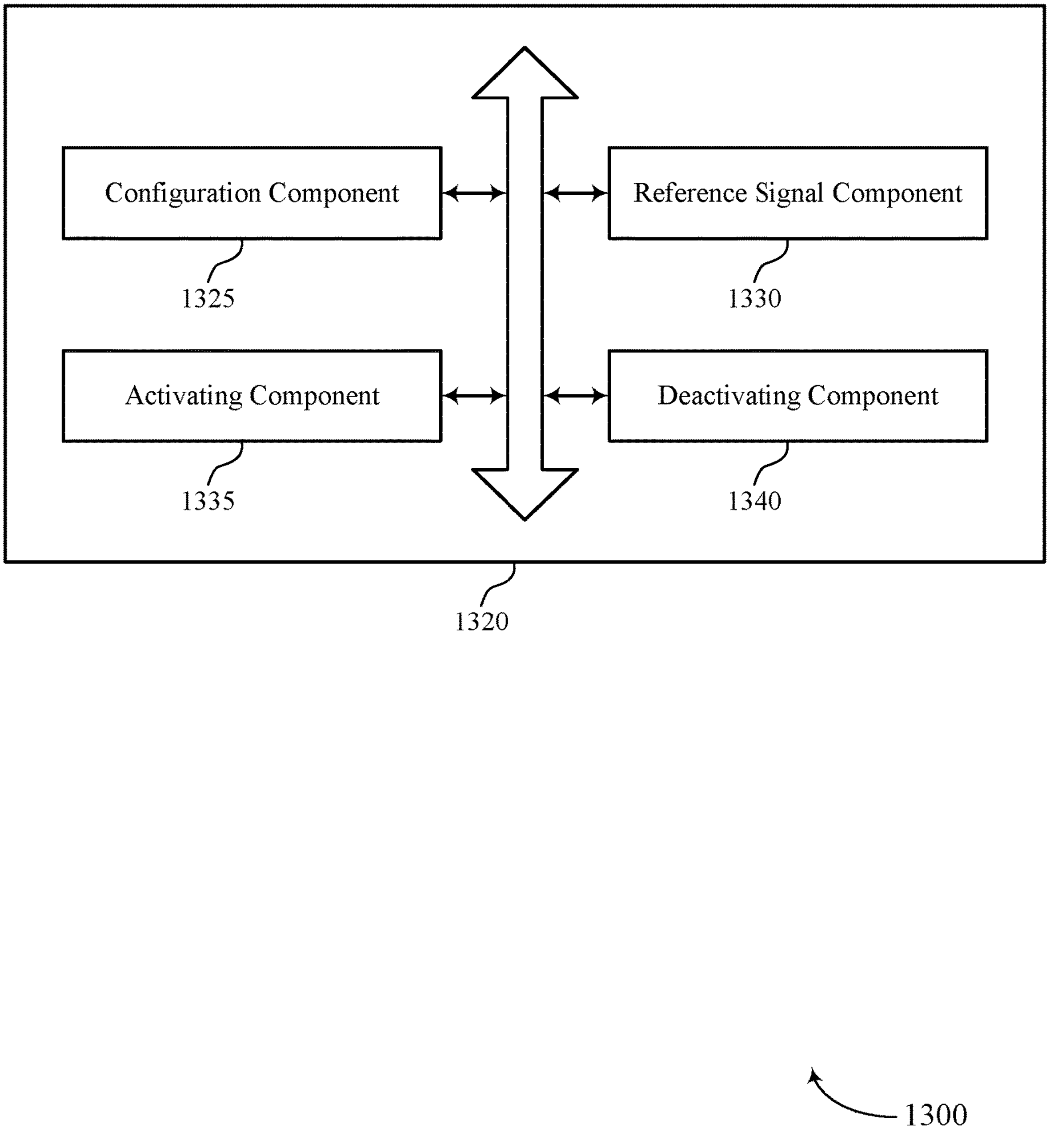
FIG. 13 shows a block diagram of a communications manager that supports enhanced BFD in accordance with one or more aspects of the present disclosure.

FIG. 13 shows a block diagram 1300 of a communications manager 1320 that supports enhanced BFD in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of enhanced BFD as described herein. For example, the communications manager 1320 may include a configuration component 1325, a reference signal component 1330, an activating component 1335, a deactivating component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The configuration component 1325 may be configured as or otherwise support a means for transmitting a message indicating a configuration associated with a beam blocking prediction procedure for a UE. The reference signal component 1330 may be configured as or otherwise support a means for transmitting one or more reference signals based on the configuration and a BFD procedure associated with the beam blocking prediction procedure.

In some examples, to support transmitting the message indicating the configuration, the configuration component 1325 may be configured as or otherwise support a means for transmitting a set of prediction parameters associated with the beam blocking prediction procedure, where the set of prediction parameters includes a threshold quantity of consecutive beam failure instance indicators, a machine learning model, one or more parameters associated with the machine learning model, a prediction type parameter, a modification parameter, a configuration switch indicator, or any combination thereof.

In some examples, the activating component 1335 may be configured as or otherwise support a means for transmitting an activation message to activate the beam blocking prediction procedure, a modified BFD procedure, or both.

In some examples, the activating component 1335 may be configured as or otherwise support a means for receiving a request message requesting activation of the beam blocking prediction procedure, the modified BFD procedure, or both where the activation message is transmitted in response to the request message.

In some examples, the deactivating component 1340 may be configured as or otherwise support a means for transmitting a deactivation message to deactivate the beam blocking prediction procedure, a modified BFD procedure, or both.

In some examples, the deactivating component 1340 may be configured as or otherwise support a means for receiving a request message requesting deactivation of the beam blocking prediction procedure, the modified BFD procedure, or both, where the deactivation message is transmitted in response to the request message.

Figure 14:
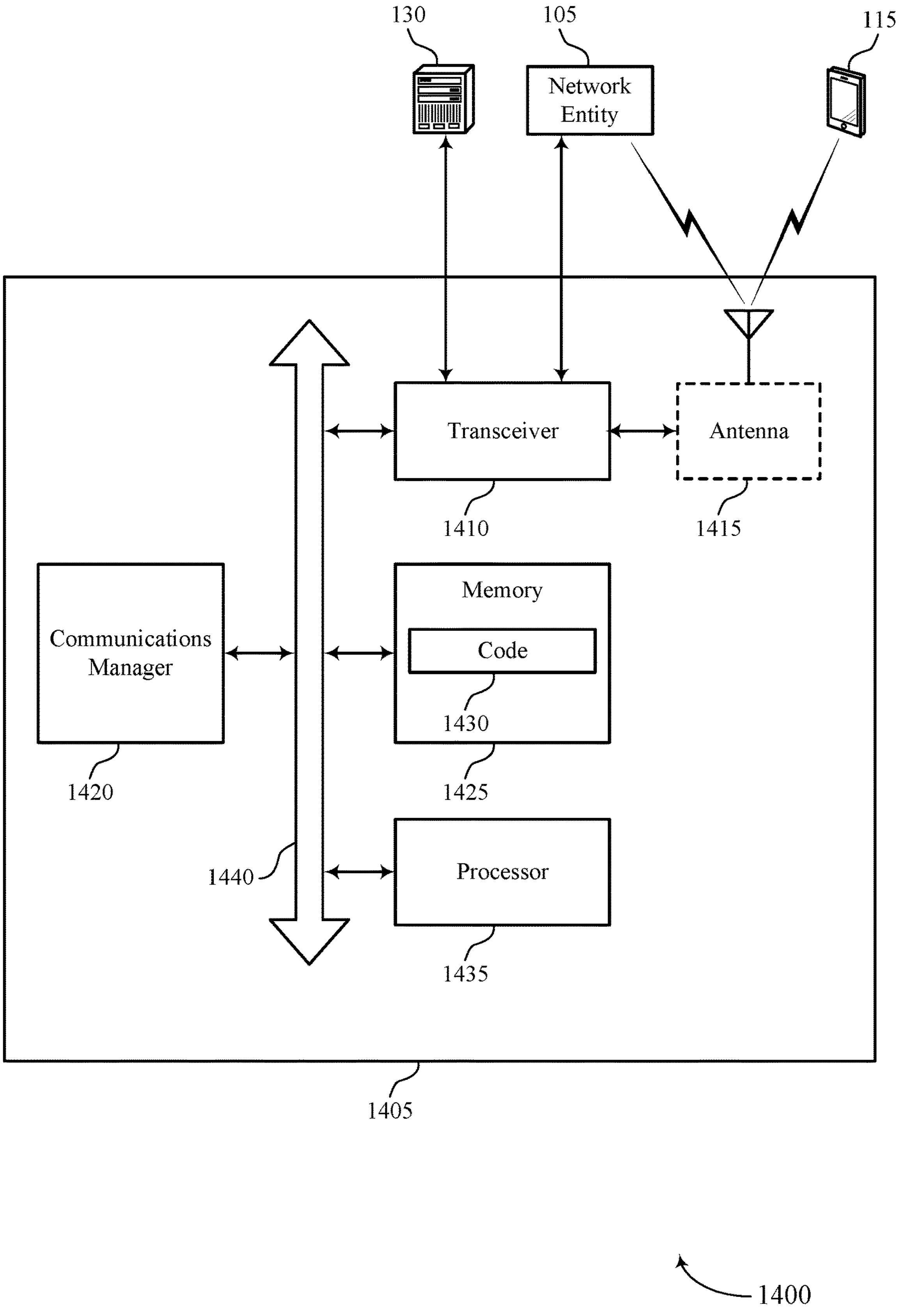
FIG. 14 shows a diagram of a system including a device that supports enhanced BFD in accordance with one or more aspects of the present disclosure.

FIG. 14 shows a diagram of a system 1400 including a device 1405 that supports enhanced BFD in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting enhanced BFD). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting a message indicating a configuration associated with a beam blocking prediction procedure for a UE. The communications manager 1420 may be configured as or otherwise support a means for transmitting one or more reference signals based on the configuration and a BFD procedure associated with the beam blocking prediction procedure.

By including or configuring the communications manager 1420 in accordance with examples as described herein, the device 1405 may support techniques for enhanced BFD resulting in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of enhanced BFD as described herein, or the processor 1435 and the memory 1425 may be otherwise configured to perform or support such operations.

Figure 15:
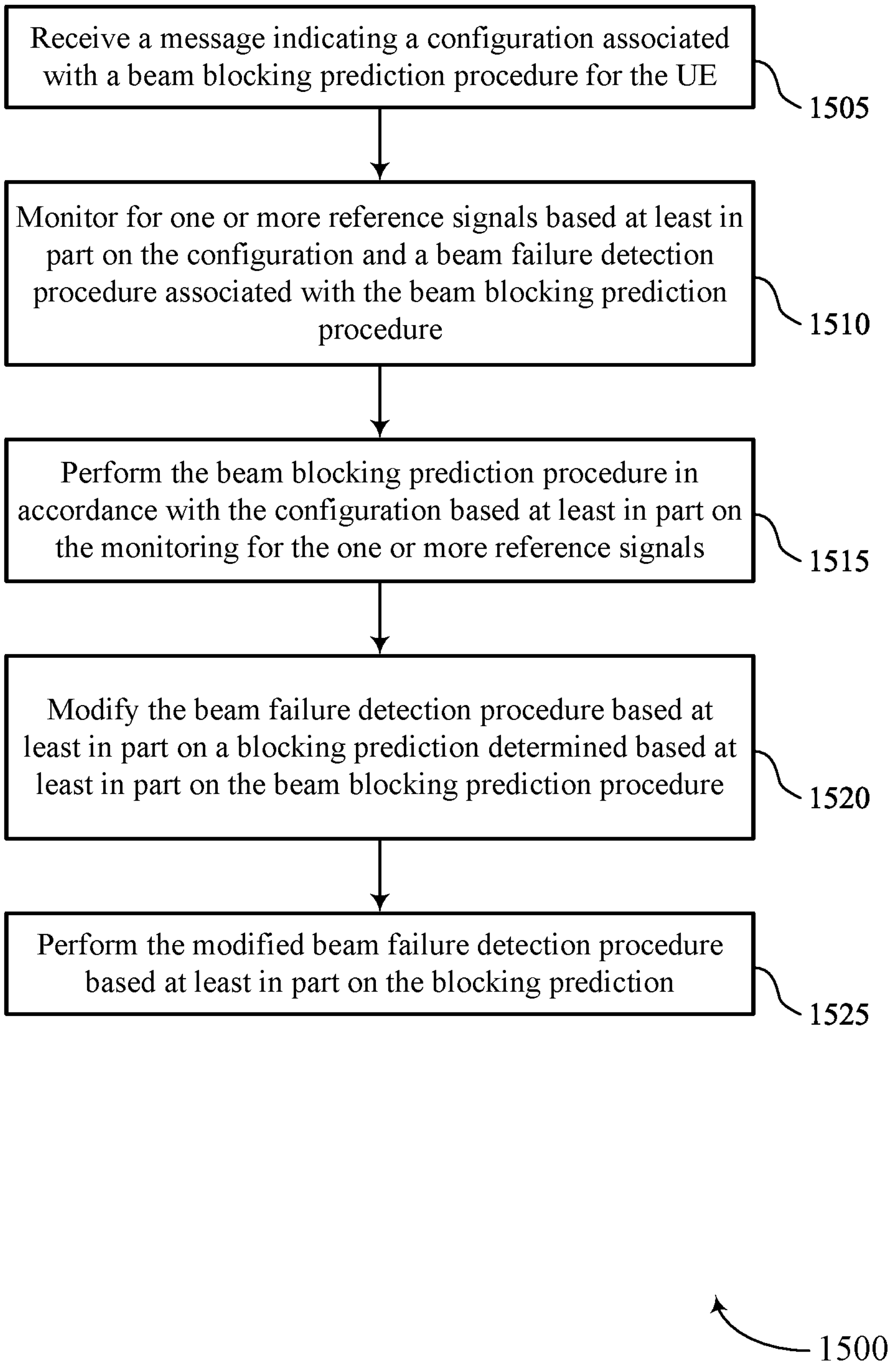
FIGS. 15 and 16 show flowcharts illustrating methods that support enhanced BFD in accordance with one or more aspects of the present disclosure.

FIG. 15 shows a flowchart illustrating a method 1500 that supports enhanced BFD in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating a configuration associated with a beam blocking prediction procedure for the UE. The operations of 1505 may be performed in accordance with examples as disclosed herein. In some examples, aspects of the operations of 1505 may be performed by a beam blocking prediction component 925 as described with reference to FIG. 9.

At 1510, the method may include monitoring for one or more reference signals based on the configuration and a BFD procedure associated with the beam blocking prediction procedure. The operations of 1510 may be performed in accordance with examples as disclosed herein. In some examples, aspects of the operations of 1510 may be performed by a monitoring component 930 as described with reference to FIG. 9.

At 1515, the method may include performing the beam blocking prediction procedure in accordance with the configuration based on the monitoring for the one or more reference signals. The operations of 1515 may be performed in accordance with examples as disclosed herein. In some examples, aspects of the operations of 1515 may be performed by a beam blocking prediction component 925 as described with reference to FIG. 9.

At 1520, the method may include modifying the BFD procedure based on a blocking prediction determined based on the beam blocking prediction procedure. The operations of 1520 may be performed in accordance with examples as disclosed herein. In some examples, aspects of the operations of 1520 may be performed by a BFD component 935 as described with reference to FIG. 9.

At 1525, the method may include performing the modified BFD procedure based on the blocking prediction. The operations of 1525 may be performed in accordance with examples as disclosed herein. In some examples, aspects of the operations of 1525 may be performed by a BFD component 935 as described with reference to FIG. 9.

Figure 16:
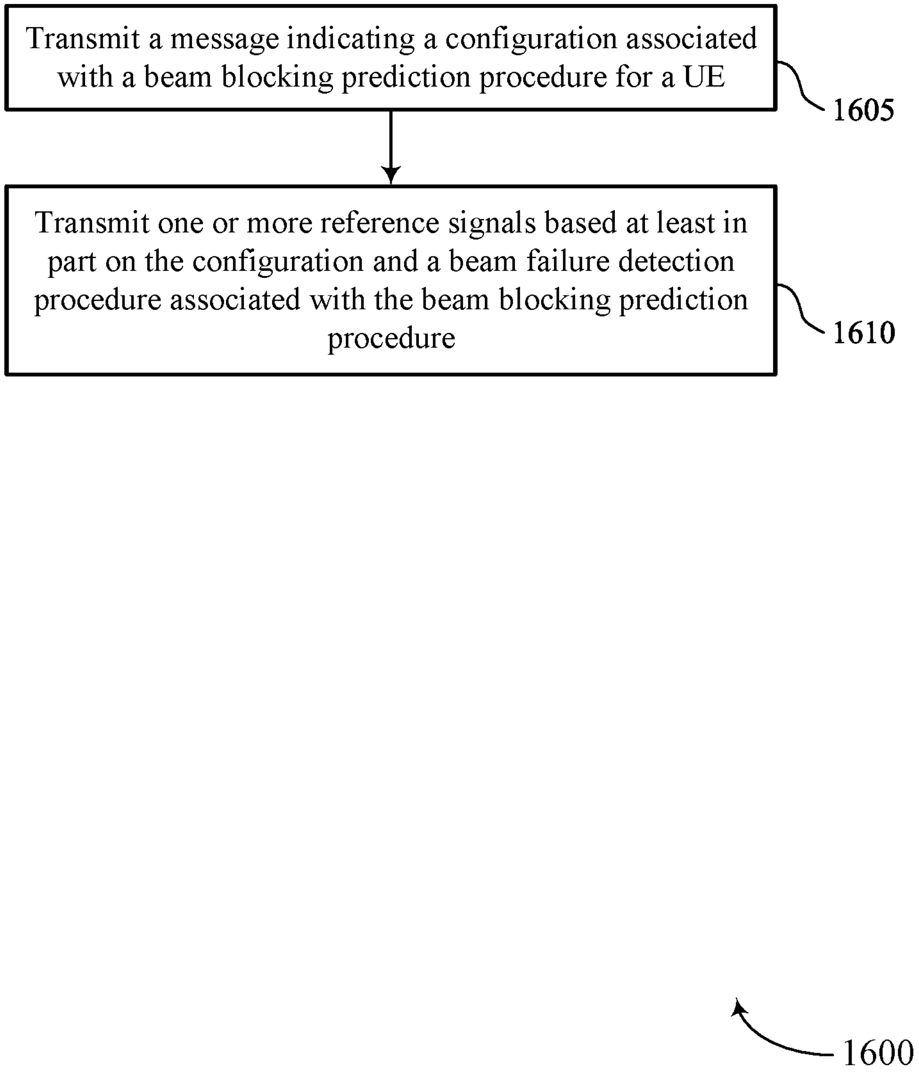

FIG. 16 shows a flowchart illustrating a method 1600 that supports enhanced BFD in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a message indicating a configuration associated with a beam blocking prediction procedure for a UE. The operations of 1605 may be performed in accordance with examples as disclosed herein. In some examples, aspects of the operations of 1605 may be performed by a configuration component 1325 as described with reference to FIG. 13.

At 1610, the method may include transmitting one or more reference signals based on the configuration and a BFD procedure associated with the beam blocking prediction procedure. The operations of 1610 may be performed in accordance with examples as disclosed herein. In some examples, aspects of the operations of 1610 may be performed by a reference signal component 1330 as described with reference to FIG. 13.

The following provides an overview of aspects of the present disclosure:

Aspect 1: A method for wireless communications at a UE, comprising: receiving a message indicating a configuration associated with a beam blocking prediction procedure for the UE; monitoring for one or more reference signals based at least in part on the configuration and a beam failure detection procedure associated with the beam blocking prediction procedure; performing the beam blocking prediction procedure in accordance with the configuration based at least in part on the monitoring for the one or more reference signals; modifying the beam failure detection procedure based at least in part on a blocking prediction determined based at least in part on the beam blocking prediction procedure; and performing the modified beam failure detection procedure based at least in part on the blocking prediction.

Aspect 2: The method of aspect 1, wherein performing the beam blocking prediction procedure comprises: determining the blocking prediction based at least in part on one or more beam failure instance indicators detected by the UE.

Aspect 3: The method of aspect 2, further comprising: detecting a quantity of consecutive beam failure instance indicators based at least in part on one or more measurements associated with the monitoring for the one or more reference signals, wherein determining the blocking prediction is based at least in part on the quantity of consecutive beam failure instance indicators exceeding a threshold quantity.

Aspect 4: The method of any of aspects 1 through 3, wherein performing the beam blocking prediction procedure comprises: determining the blocking prediction based at least in part on a machine learning model.

Aspect 5: The method of aspect 4, wherein determining the blocking prediction based at least in part on the machine learning model comprises: inputting a set of parameters associated with the beam failure detection procedure into the machine learning model, wherein the set of parameters associated with the beam failure detection procedure is based at least in part on the monitoring.

Aspect 6: The method of aspect 5, wherein the set of parameters associated with the beam failure detection procedure comprises a SINR, a RSRP, an SNR, a pathloss measurement, a quantity of BFI indicators detected by the UE, a quantity of available preambles for performing a CFRA procedure, or a combination thereof.

Aspect 7: The method of any of aspects 1 through 6, wherein performing the beam blocking prediction procedure comprises: performing the beam blocking prediction procedure based at least in part on a set of prediction parameters associated with the beam blocking prediction procedure, wherein the configuration associated with the beam blocking procedure indicates the set of prediction parameters.

Aspect 8: The method of aspect 7, wherein the set of prediction parameters comprises a threshold quantity of consecutive beam failure instance indicators, a machine learning model, one or more parameters associated with the machine learning model, a prediction method indicator, or any combination thereof.

Aspect 9: The method of any of aspects 1 through 8, wherein modifying the beam failure detection procedure comprises: modifying the beam failure detection procedure based at least in part on an indication of a configuration switch, wherein the configuration associated with the beam blocking procedure comprises the indication of the configuration switch.

Aspect 10: The method of any of aspects 1 through 9, wherein performing the modified beam failure detection procedure comprises: pausing the monitoring for the one or more reference signals during a blocking period associated with the blocking prediction; and resuming the monitoring for the one or more reference signals after the blocking period.

Aspect 11: The method of any of aspects 1 through 10, wherein performing the modified beam failure detection procedure comprises: pausing counting of beam failure instance indicators detected by the UE during a blocking period associated with the blocking prediction; and resuming the counting of beam failure instance indicators detected by the UE after the blocking period.

Aspect 12: The method of any of aspects 1 through 11, further comprising: receiving an activation message instructing the UE to activate the beam blocking prediction procedure, the modified beam failure detection procedure, or both, wherein the beam block prediction procedure, the modified beam failure detection procedure, or both, are performed based at least in part on the activation message.

Aspect 13: The method of aspect 12, further comprising: transmitting a request message requesting activation of the beam blocking prediction procedure, the modified beam failure detection procedure, or both, wherein the activation message is received in response to the request message.

Aspect 14: The method of aspect 13, wherein activation of the beam blocking prediction procedure, the modified beam failure detection procedure, or both, are based at least in part on a quality of service parameter, a power restraint parameter of the UE, a capacity associated with the UE, one or more parameters associated with a discontinuous cycle of the UE, or any combination thereof.

Aspect 15: The method of any of aspects 1 through 14, further comprising: receiving a deactivation message instructing the UE to deactivate the beam blocking prediction procedure, the modified beam failure detection procedure, or both; and deactivating the beam blocking prediction procedure, the modified beam failure detection procedure, or both, based at least in part on the deactivation message.

Aspect 16: The method of aspect 15, further comprising: transmitting a request message requesting deactivation of the beam blocking prediction procedure, the modified beam failure detection procedure, or both, wherein the deactivation message is received in response to the request message.

Aspect 17: The method of aspect 16, wherein deactivation of the beam blocking prediction procedure, the modified beam failure detection procedure, or both, are based at least in part on a quality of service parameter, a power restraint parameter of the UE, a capacity associated with the UE, one or more parameters associated with a discontinuous cycle of the UE, or any combination thereof.

Aspect 18: The method of any of aspects 1 through 17, further comprising: measuring a signal quality of a first reference signal of the one or more reference signals; and detecting a beam failure instance for the first reference signal based at least in part on the signal quality being below a threshold quality.

Aspect 19: The method of aspect 18, further comprising: initiating a timer associated with the beam failure detection procedure based at least in part on the beam failure instance; and counting a quantity of beam failure instances during a duration associated with the timer.

Aspect 20: The method of any of aspects 1 through 19, wherein the one or more reference signals comprises one or more beam failure detection reference signals, channel state information reference signals, or synchronization signal blocks.

Aspect 21: A method for wireless communications at a network entity, comprising: transmitting a message indicating a configuration associated with a beam blocking prediction procedure for a UE; and transmitting one or more reference signals based at least in part on the configuration and a beam failure detection procedure associated with the beam blocking prediction procedure.

Aspect 22: The method of aspect 21, wherein transmitting the message indicating the configuration comprises: transmitting a set of prediction parameters associated with the beam blocking prediction procedure, wherein the set of prediction parameters comprises a threshold quantity of consecutive beam failure instance indicators, a machine learning model, one or more parameters associated with the machine learning model, a prediction type parameter, a modification parameter, a configuration switch indicator, or any combination thereof.

Aspect 23: The method of any of aspects 21 through 22, further comprising: transmitting an activation message to activate the beam blocking prediction procedure, a modified beam failure detection procedure, or both.

Aspect 24: The method of aspect 23, further comprising: receiving a request message requesting activation of the beam blocking prediction procedure, the modified beam failure detection procedure, or both wherein the activation message is transmitted in response to the request message.

Aspect 25: The method of any of aspects 21 through 24, further comprising: transmitting a deactivation message to deactivate the beam blocking prediction procedure, a modified beam failure detection procedure, or both.

Aspect 26: The method of aspect 25, further comprising: receiving a request message requesting deactivation of the beam blocking prediction procedure, the modified beam failure detection procedure, or both, wherein the deactivation message is transmitted in response to the request message.

Aspect 27: An apparatus for wireless communications at a UE, comprising a processor; memory coupled with the processor; and instructions stored in the memory and executable by the processor to cause the apparatus to perform a method of any of aspects 1 through 20.

Aspect 28: An apparatus for wireless communications at a UE, comprising at least one means for performing a method of any of aspects 1 through 20.

Aspect 29: A non-transitory computer-readable medium storing code for wireless communications at a UE, the code comprising instructions executable by a processor to perform a method of any of aspects 1 through 20.

Aspect 30: An apparatus for wireless communications at a network entity, comprising a processor; memory coupled with the processor; and instructions stored in the memory and executable by the processor to cause the apparatus to perform a method of any of aspects 21 through 26.

Aspect 31: An apparatus for wireless communications at a network entity, comprising at least one means for performing a method of any of aspects 21 through 26.

Aspect 32: A non-transitory computer-readable medium storing code for wireless communications at a network entity, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended FIGS., similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a message indicating a configuration associated with a beam blocking prediction procedure for the UE;

monitoring for one or more reference signals based at least in part on the configuration and a beam failure detection procedure associated with the beam blocking prediction procedure;

performing the beam blocking prediction procedure in accordance with the configuration based at least in part on the monitoring for the one or more reference signals;

modifying the beam failure detection procedure based at least in part on a blocking prediction determined in accordance with the beam blocking prediction procedure; and performing the modified beam failure detection procedure based at least in part on the blocking prediction.

2. The method of claim 1, wherein performing the beam blocking prediction procedure comprises:

determining the blocking prediction based at least in part on one or more beam failure instance indicators detected by the UE.

3. The method of claim 2, further comprising:

detecting a quantity of consecutive beam failure instance indicators based at least in part on one or more measurements associated with the monitoring for the one or more reference signals, wherein determining the blocking prediction is based at least in part on the quantity of consecutive beam failure instance indicators exceeding a threshold quantity.

4. The method of claim 1, wherein performing the beam blocking prediction procedure comprises:

determining the blocking prediction based at least in part on a machine learning model.

5. The method of claim 4, wherein determining the blocking prediction based at least in part on the machine learning model comprises:

inputting a set of parameters associated with the beam failure detection procedure into the machine learning model, wherein the set of parameters associated with the beam failure detection procedure is based at least in part on the monitoring.

6. The method of claim 5, wherein the set of parameters associated with the beam failure detection procedure comprises a signal-to-interference-plus-noise ratio (SINR), a reference signal received power (RSRP), a signal-to-noise ratio (SNR), a pathloss measurement, a quantity of BFI indicators detected by the UE, a quantity of available preambles for performing a contention free random access (CFRA) procedure, or a combination thereof.

7. The method of claim 1, wherein performing the beam blocking prediction procedure comprises:

performing the beam blocking prediction procedure based at least in part on a set of prediction parameters associated with the beam blocking prediction procedure, wherein the configuration associated with the beam blocking prediction procedure indicates the set of prediction parameters.

8. The method of claim 7, wherein the set of prediction parameters comprises a threshold quantity of consecutive beam failure instance indicators, a machine learning model, one or more parameters associated with the machine learning model, a prediction method indicator, or any combination thereof.

9. The method of claim 1, wherein modifying the beam failure detection procedure comprises:

modifying the beam failure detection procedure based at least in part on an indication of a configuration switch, wherein the configuration associated with the beam blocking prediction procedure comprises the indication of the configuration switch.

10. The method of claim 1, wherein performing the modified beam failure detection procedure comprises:

pausing the monitoring for the one or more reference signals during a blocking period associated with the blocking prediction; and resuming the monitoring for the one or more reference signals after the blocking period.

11. The method of claim 1, wherein performing the modified beam failure detection procedure comprises:

pausing counting of beam failure instance indicators detected by the UE during a blocking period associated with the blocking prediction; and resuming the counting of beam failure instance indicators detected by the UE after the blocking period.

12. The method of claim 1, further comprising:

receiving an activation message instructing the UE to activate the beam blocking prediction procedure, the modified beam failure detection procedure, or both, wherein the beam blocking prediction procedure, the modified beam failure detection procedure, or both, are performed based at least in part on the activation message.

13. The method of claim 12, further comprising:

transmitting a request message requesting activation of the beam blocking prediction procedure, the modified beam failure detection procedure, or both, wherein the activation message is received in response to the request message.

14. The method of claim 13, wherein activation of the beam blocking prediction procedure, the modified beam failure detection procedure, or both, are based at least in part on a quality of service parameter, a power restraint parameter of the UE, a capacity associated with the UE, one or more parameters associated with a discontinuous cycle of the UE, or any combination thereof.

15. The method of claim 1, further comprising:

receiving a deactivation message instructing the UE to deactivate the beam blocking prediction procedure, the modified beam failure detection procedure, or both; and deactivating the beam blocking prediction procedure, the modified beam failure detection procedure, or both, based at least in part on the deactivation message.

16. The method of claim 15, further comprising:

transmitting a request message requesting deactivation of the beam blocking prediction procedure, the modified beam failure detection procedure, or both, wherein the deactivation message is received in response to the request message.

17. The method of claim 16, wherein deactivation of the beam blocking prediction procedure, the modified beam failure detection procedure, or both, are based at least in part on a quality of service parameter, a power restraint parameter of the UE, a capacity associated with the UE, one or more parameters associated with a discontinuous cycle of the UE, or any combination thereof.

18. The method of claim 1, further comprising:

measuring a signal quality of a first reference signal of the one or more reference signals; and detecting a beam failure instance for the first reference signal based at least in part on the signal quality being below a threshold quality.

19. The method of claim 18, further comprising:

initiating a timer associated with the beam failure detection procedure based at least in part on the beam failure instance; and counting a quantity of beam failure instances during a duration associated with the timer.

20. The method of claim 1, wherein the one or more reference signals comprises one or more beam failure detection reference signals, channel state information reference signals, or synchronization signal blocks.

21. A method for wireless communications at a network entity, comprising:

transmitting an activation message to activate a beam blocking prediction procedure corresponding to a modification of a beam failure detection procedure;

transmitting a message indicating a configuration associated with the beam blocking prediction procedure to be performed by a user equipment (UE), the beam blocking prediction procedure associated with prediction, by the UE, of temporary blockage of one or more beams based at least in part on one or more reference signals; and transmitting the one or more reference signals based at least in part on the configuration and a modified beam failure detection procedure associated with the beam blocking prediction procedure.

22. The method of claim 21, wherein transmitting the message indicating the configuration comprises:

transmitting a set of prediction parameters associated with the beam blocking prediction procedure, wherein the set of prediction parameters comprises a threshold quantity of consecutive beam failure instance indicators, a machine learning model, one or more parameters associated with the machine learning model, a prediction type parameter, a modification parameter, a configuration switch indicator, or any combination thereof.

23. The method of claim 21, wherein transmitting the activation message further comprises:

transmitting the activation message to activate the modified beam failure detection procedure.

24. The method of claim 23, further comprising:

receiving a request message requesting activation of the beam blocking prediction procedure, the modified beam failure detection procedure, or both wherein the activation message is transmitted in response to the request message.

25. The method of claim 21, further comprising:

transmitting a deactivation message to deactivate the beam blocking prediction procedure, the modified beam failure detection procedure, or both.

26. The method of claim 25, further comprising:

receiving a request message requesting deactivation of the beam blocking prediction procedure, the modified beam failure detection procedure, or both, wherein the deactivation message is transmitted in response to the request message.

27. An apparatus for wireless communications at a user equipment (UE), comprising:

one or more processors; and instructions stored in one or more memories and executable by the one or more processors to cause the apparatus to:

receive a message indicating a configuration associated with a beam blocking prediction procedure for the UE;

monitor for one or more reference signals based at least in part on the configuration and a beam failure detection procedure associated with the beam blocking prediction procedure;

perform the beam blocking prediction procedure in accordance with the configuration based at least in part on the monitoring for the one or more reference signals;

modify the beam failure detection procedure based at least in part on a blocking prediction determined in accordance with the beam blocking prediction procedure; and perform the modified beam failure detection procedure based at least in part on the blocking prediction.

28. The apparatus of claim 27, wherein, to perform the beam blocking prediction procedure, the instructions are executable by the one or more processors to cause the apparatus to:

determine the blocking prediction based at least in part on one or more beam failure instance indicators detected by the UE.

29. The apparatus of claim 27, wherein, to perform the beam blocking prediction procedure, the instructions are executable by the one or more processors to cause the apparatus to:

determine the blocking prediction based at least in part on a machine learning model.

30. An apparatus for wireless communications at a network entity, comprising:

one or more processors; and instructions stored in one or more memories and executable by the one or more processors to cause the apparatus to:

transmit an activation message to activate a beam blocking prediction procedure corresponding to a modification of a beam failure detection procedure;

transmit a message indicating a configuration associated with the beam blocking prediction procedure to be performed by a user equipment (UE), the beam blocking prediction procedure associated with prediction, by the UE, of temporary blockage of one or more beams based at least in part on one or more reference signals; and transmit the one or more reference signals based at least in part on the configuration and a modified beam failure detection procedure associated with the beam blocking prediction procedure.

* * * * *